(12) United States Patent
Van Wyk et al.

(10) Patent No.: US 11,111,128 B2
(45) Date of Patent: Sep. 7, 2021

(54) REMOTE FILLING SYSTEM

(71) Applicants: Loren Van Wyk, Pella, IA (US);
Daniel John Nibe, Ellsworth, IA (US);
Jordan M. King, Pella, IA (US);
Aaron J. DeBruin, Pella, IA (US)

(72) Inventors: Loren Van Wyk, Pella, IA (US);
Daniel John Nibe, Ellsworth, IA (US);
Jordan M. King, Pella, IA (US);
Aaron J. DeBruin, Pella, IA (US)

(73) Assignee: LDJ MANUFACTURING, INC., Pella, IA (US)

(*) Notice: Subject to any disclaimer, the term of this patent is extended or adjusted under 35 U.S.C. 154(b) by 0 days.

(21) Appl. No.: 16/546,010

(22) Filed: Aug. 20, 2019

(65) Prior Publication Data

US 2020/0055491 A1 Feb. 20, 2020

Related U.S. Application Data

(60) Provisional application No. 62/719,722, filed on Aug. 20, 2018.

(51) Int. Cl.
| | |
|---|---|
| *B67D 7/04* | (2010.01) |
| *B60S 5/02* | (2006.01) |
| *G01F 23/30* | (2006.01) |
| *B67D 7/62* | (2010.01) |
| *B67D 7/82* | (2010.01) |
| *B67D 7/02* | (2010.01) |
| *B67D 7/84* | (2010.01) |
| *B67D 7/36* | (2010.01) |
| *B67D 7/40* | (2010.01) |
| *B67D 7/78* | (2010.01) |

(Continued)

(52) U.S. Cl.
CPC .............. *B67D 7/0401* (2013.01); *B60S 5/02* (2013.01); *B67D 7/02* (2013.01); *B67D 7/04* (2013.01); *B67D 7/36* (2013.01); *B67D 7/362* (2013.01); *B67D 7/40* (2013.01); *B67D 7/62* (2013.01); *B67D 7/78* (2013.01); *B67D 7/82* (2013.01); *B67D 7/845* (2013.01); *G01F 23/00* (2013.01); *G01F 23/30* (2013.01); *G01F 23/64* (2013.01); *B67D 2007/0444* (2013.01)

(58) Field of Classification Search
CPC .......... B67D 7/0401; B67D 7/40; B67D 7/78; B67D 7/62; B67D 7/82; B67D 7/02; B67D 7/845; B67D 7/04; B67D 7/36; B67D 7/362; B67D 2007/0444; G01F 23/64; G01F 23/00; G01F 23/30; B60S 5/02

See application file for complete search history.

(56) References Cited

U.S. PATENT DOCUMENTS

| | | | | |
|---|---|---|---|---|
| 4,765,359 A | * | 8/1988 | Burnett ................... | B60K 15/00 137/255 |
| 6,889,728 B2 | * | 5/2005 | Kamikozuru ......... | B60P 3/2245 141/231 |

(Continued)

*Primary Examiner* — Nicolas A Arnett
(74) *Attorney, Agent, or Firm* — David M. Breiner; BrownWinick Law Firm

(57) ABSTRACT

A system comprising a plurality of ports is capable of automated, remote detection of conditions indicating that refill is required in one of a plurality of remote tanks and causing refill of the tank via at least one of the plurality of ports. Further, the system includes automated monitoring and supply of a fuel tank.

16 Claims, 15 Drawing Sheets

(51) Int. Cl.
*G01F 23/64* (2006.01)
*G01F 23/00* (2006.01)

(56) References Cited

U.S. PATENT DOCUMENTS

| | | | | |
|---|---|---|---|---|
| 7,328,728 B1* | 2/2008 | Vilar | | B60P 3/14 |
| | | | | 137/565.17 |
| 7,588,060 B2* | 9/2009 | Ballard | | B67D 7/42 |
| | | | | 141/192 |
| 7,628,182 B2* | 12/2009 | Poulter | | B67D 7/36 |
| | | | | 137/263 |
| 8,069,710 B2* | 12/2011 | Dodd | | B60K 15/03 |
| | | | | 73/114.54 |
| 8,561,921 B1* | 10/2013 | Showman | | B05B 7/2497 |
| | | | | 239/414 |
| 8,794,307 B2* | 8/2014 | Coquilleau | | E21B 33/13 |
| | | | | 166/75.15 |
| 9,346,662 B2* | 5/2016 | Van Vliet | | B67D 7/04 |
| 9,371,830 B2* | 6/2016 | Moffitt, Jr. | | F04B 53/10 |
| 9,371,831 B2* | 6/2016 | Moffitt, Jr. | | B67D 7/58 |
| 9,725,295 B2* | 8/2017 | McKay | | B67D 7/3209 |
| 9,790,080 B1* | 10/2017 | Shock | | B67D 7/3272 |
| 9,815,683 B1* | 11/2017 | Kalala | | B67D 7/3218 |
| 10,604,403 B2* | 3/2020 | Schmidt | | B67D 7/04 |
| 10,752,491 B2* | 8/2020 | Schmidt | | B67D 7/0401 |
| 2005/0098226 A1* | 5/2005 | Rounds | | F01M 11/0458 |
| | | | | 141/65 |
| 2005/0166993 A1* | 8/2005 | Viken | | F01M 11/0458 |
| | | | | 141/98 |
| 2007/0181212 A1* | 8/2007 | Fell | | B60P 3/14 |
| | | | | 141/231 |
| 2008/0105329 A1* | 5/2008 | Benjey | | B67D 7/0476 |
| | | | | 141/59 |
| 2008/0277018 A1* | 11/2008 | Worswick | | F04D 13/086 |
| | | | | 141/1 |
| 2013/0213502 A1* | 8/2013 | Van Wyk | | B67D 7/02 |
| | | | | 137/565.12 |
| 2014/0174599 A1* | 6/2014 | Porcile | | B67D 7/68 |
| | | | | 141/86 |
| 2017/0009905 A1* | 1/2017 | Arnold | | B67D 7/04 |

* cited by examiner

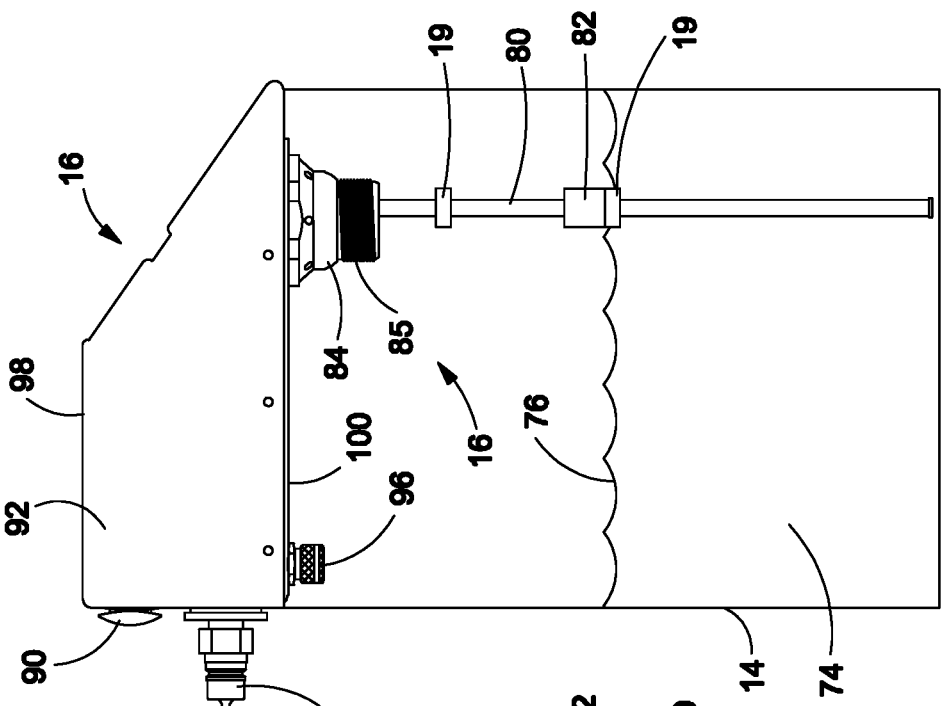
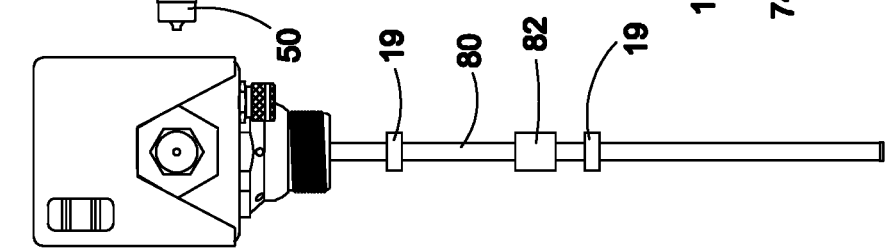
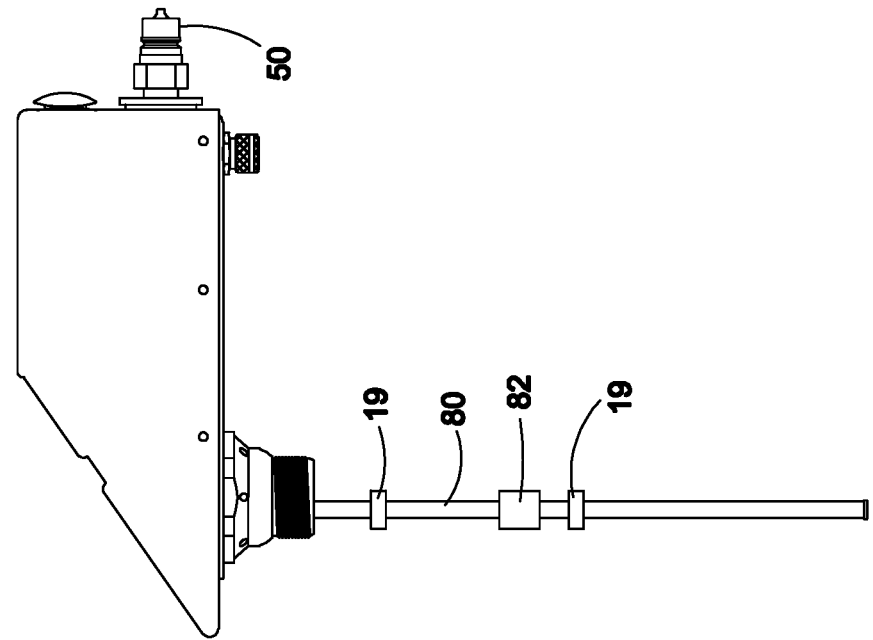

REMOTE FILLING SYSTEM

CROSS REFERENCE TO RELATED APPLICATIONS

This application claims priority to U.S. Provisional Application No. 62/719,722 which was filed on Aug. 20, 2019, the entirety of which is incorporated herein fully by reference.

FIELD OF THE DISCLOSURE

This disclosure generally relates to a fuel storage and an automated remote filling system for multiple engine simultaneous use. More specifically, and without limitation, this disclosure relates to a portable refill unit for a multi-port system.

BACKGROUND OF THE DISCLOSURE

Fuel storage and transport are challenges faced by many industries. The stored fluid may be flammable or explosive; it may be sensitive to temperature changes; it may degrade if exposed to the environment; it may be a pollutant if spilled. Examples of such fuels include commonly used materials such as diesel fuel, gasoline, DEF fluid, oils, and other petrochemicals and additives. These materials are often dangerous to the environment if accidental spills occur and often comprise a level of flammability which requires equipment specially constructed to minimize the likelihood of sparks. Further, fuel and other gases, fluids and additives are used for or during the operation of many machines including in the operation of stationary engines.

A stationary engine is an engine whose framework does not move and the engine is not otherwise equipped to be moved while the engine is running. Stationary engines are commonly used to power immobile equipment, such as augers for material movement, pumps to inject fracking fluid or to pump oil from the ground and/or storage, generators, mills or other machinery including machinery found on an oil field frack site. The term stationary engine usually refers to large, immobile, reciprocating engines and, in some cases, other internal combustion engines.

Stationary engines which consume fuel provide advantages over electrical engines. Fossil fuel-consuming stationary engines provide convenience because they are able to be remotely located. In contrast, operation of an electric engine requires association with a power grid or other electrical power source, such as a generator which produces electricity from fuel. Although a stationary engine has the advantage of being able to operate a wide variety of equipment at almost any location, a remote stationary engine also poses the challenge of providing an adequate volume of fuel for operation. Likewise, it is challenging to provide other fluids and additives necessary for operation or maintenance at the site of operation. Additionally, some stationary engines are, in fact, portable and periodically need to be moved from one location to another for operation, and often times need to be moved in rapid succession. Thus, a system and method for efficiently, remotely, and safely refueling engines, or providing additives as needed—whether the engine is stationery, quasi-stationery, or intermittently mobile—are needed.

The need is, therefore, for a portable refill unit for autonomous refilling of fuel tanks with fuel, or additive reservoirs with additives, on multiple engines that may be co-located. Such a new portable refill unit should improve upon the state of the art. It should provide great advantages including but not limited to, efficiency in terms of time and expense, ease, speed and more, over the current state of the art relative to refueling, lubrication, pollution control, or other fluid needs in remote areas.

The operation of a stationary (or semi-stationary) engine often takes place in locations which are quite remote from a source of fuel and/or fuel additives necessary for their continued and efficient operation. Even if not stationary, the machine employing fuel may be of the sort that is not road ready or equipped to be efficiently transported to a place where fuel or necessary additives are stored and it can be refueled or additives replaced. The stationary or less road-ready engine may be so remotely located as to make transport to a fuel source otherwise impractical. These engines are often required to run for long periods of time and/or at high RPM's (revolutions per minute) resulting in high volume fuel and additive usage and the need to re-supply both often. An example application may be at mining sites where, e.g., fracking is employed. Typically, fracking sites are not located near populated areas, nor located near convenient sources of either electrical or fossil fuel sources. Yet, the machinery employed for this activity requires fuel in relatively high volume and, often, requires operation of said machinery nearly round the clock. There are, in fact, many remotely located activities powered by either stationary or mostly stationary engines that are fossil fuel dependent or dependent on other liquids. Maintaining adequate fuel levels in each necessary engine and managing transportation and storage of this fuel requires many man hours. The remoteness of such locations may not be appealing to many possible employees, making the job of monitoring and replenishing fuel and additives to each machine quite unappealing and, therefore, expensive for the employer to fund. What was needed were means to drastically reduce the need for human-provided re-fueling and engine maintenance needs at remote sites, especially where stationary engines run. Many of these kinds of operations employ multiple large engines in simultaneous operation. In addition to fuel requisites, these engines also require exhaust or other treatments in order to meet emissions standards. Delivering additives to each engine necessary to meet emissions standards can be challenging. Further, engines do not all operate identically; they will use additives at different rates. The lack of accurate models of fuel use and additive requirements for engines operating under these conditions and powering various operations leads to real loss in both time and cost efficiencies. In remote areas, fuel outages, and operational stoppages for refueling and/or for replenishing additive introduces inefficiencies and costs. Avoiding these inefficiencies and costs would benefit these industries.

Safe storage and ready availability of the fuel and additive materials are key to the efficiency of many processes and operations. One such fluid employed in industrial settings is diesel used as a fuel. Many diesel fueled machines require inclusion of DEF (Diesel exhaust fluid) to meet either the machine's emissions standards or environmental requirements. Other additives may also be required and provided in a liquid form.

A number of fuels, fuel treatments, additives, and exhaust treatments (such as Diesel Exhaust Fluid (DEF)) may be transported or transferred in fluid form. Many are temperature sensitive or sensitive to other environmental conditions. For example, DEF starts to become viscous and unusable for most diesel engines at 23 degrees Fahrenheit and, generally, should be maintained at or above 25 degrees Fahrenheit for usability, at least for diesel powered motors and diesel powered stationary motors. Certain machines (or industry or local regulations) require the inclusion of DEF as an additive for exhaust treatment wherein DEF is injected into the exhaust system to clean the exhaust from various nitrous oxides or to increase efficiency of fuel use. In these instances, DEF is added to the exhaust stream of the engine where it is converted to ammonia and carbon dioxide by a catalyst; the ammonia then reacts with NOx to produce low-toxicity N2 and H2O.

Maintaining constant, dependable fuel and/or additive delivery to a remote, stationary engine is a challenge. In these scenarios, a remote or stationary engine may need to be refueled often, especially if the remote or stationary engine uses a high amount of fuel or is not able to accommodate a large amount of fuel in its own storage tank. A stationary machine powered by the remote or stationary engine may not be able to be adapted to accommodate an increased amount of fuel storage (or adaptation may not be financially feasible or meet safety standards) and, therefore, will require a reasonably efficient means of refueling or providing additive for the remote or stationary engine. There is, therefore, a need for more efficient, just-in-time, portable mechanism for delivery of fluids to remotely located stationary engines.

BRIEF SUMMARY OF THE DISCLOSURE

The present invention comprises a multi-port remote filling system and fulfills a need for a portable refill unit for refilling remotely located fuel tanks or additive reservoirs autonomously. For these reasons and many others, the present disclosure provides great advantages including, but not limited to, efficiency in terms of time and money, ease of use, speed and more, over the current state of the art.

One way of addressing the challenges herein previously described includes providing a novel remote multi-port filling or refueling or replenishing system for stationary engines that are located in remote areas.

The novel remote filling system of the present invention provides a solution. The novel remote filling system comprises at least one supply tank housing fuel or an additive and at least one reservoir located at or near at least one stationary engine all co-located as a system at a remote location. In embodiments there may be multiple stationary engines. Each of the engines is fluidly associated with one or more reservoirs to which the multi-port remote filling system supplies the fuel or the additive as needed and as described herein. The system may include valves, sensors, and often times one or more of a conduit, a manifold, a trailer, a pump, controls, detectors, switches, and/or couplers for initiating, managing, facilitating and terminating fuel or additive flow and shut off as will be more fully described herein.

The present disclosure comprises several embodiments of an assembly for a multi-port remote filling system. Exemplary embodiments may include a system which could be mounted on a vehicle, in a truck bed or in a trailer. Alternatively, the system could be enclosed by, or mounted on, a trailer to be towed; or positioned on a wheeled platform, or a skid to be secured on a wheeled platform or trailer. This embodiment could be relocated to a variety of remote locations efficiently and quickly. Alternatively, the system may be permanently installed at a location where at least one, and conceivably many, engines require periodic refueling or require periodic refilling of an additive or emissions control fluid.

The multi-port remote filling system, at its most basic form, includes or is generally co-located with and fluidly associated with each of a plurality of engines each of which is at least temporarily stationary and immobilized. Each of the engines requires fuel, or perhaps requires certain additives for continued operation. The multi-port remote filling system presented herein may comprise a wireless system or network, preferably relying on blue tooth and wi-fi signaling as needed. A wired embodiment is also contemplated.

Fluid pressure may be the main currency of operation in the present invention. In an embodiment, upon occurrence of low pressure in a conduit, line or hose, a switch is tripped initiating wi-fi or blue tooth signaling. A receiver processes the signal to open a valve, allowing fluid to run until pressure is built back to acceptable levels, at which time the switch is tripped again initiating a second signal which is received by the receiver and the valve is closed. As another example, a sender/float set up as is known in the art may be employed to send a binary signal to enable flow or cease flow in a manner known in the art or to cause a valve to switch between open and closed, thereby controlling fluid flow. In either arrangement there is no communication necessary between the stationary engine and the multi-port remote filling system that delivers fluid. There is no requirement for engine shut down for refueling.

Alternatively to a permanently or semi-permanently located multi-port remote filling system, a truck or trailer mounted multi-port filling system may be employed, including a pump to move the fuel or additive out of the truck or trailer mounted refueling or refilling system, and an opening in the fuel or additive tank through which fuel or additive can be onloaded. In this system, the truck or trailer and its associated multi-port filling system can be parked at a remote location, or the trailer can be left at a remote location so that remote refueling (or provision of additive) can take place automatically or by remote operation by an operator using a control device such as a computer, tablet, mobile phone, or the like.

The novel multi-port remote filling system of the present invention may be employed to provide nearly any kind of fuel such as diesel, jet fuel, or gasoline; or to supply additives such as DEF, etc. For example, in a situation where there are many engines burning diesel as fuel, the exhaust produced by each engine should be treated by DEF to reduce NOx. Depending on the location of these engines, there may be a need to periodically re-supply either fuel or additive or both to each of the engines. Further, engines do not all burn fuel at the same rate or require additional additive at the same time; some may be empty before others such that automated systems based on time rather than fill status of each engine would introduce unnecessary inefficiencies to the re-fueling and provision of additive maintenance processes. There is, therefore, a need for a system that can be automated to facilitate supply of a fluid material on a per engine, as needed, basis via remote detection and control. In the aforementioned situation where fuel and additive may both be required, two remote filling systems of the present invention may be employed.

In an example, each stationary diesel engine requires additive in the form of DEF treatment. A tank or reservoir for storing DEF in usable condition will usually require an auxiliary heater to add heat and maintain the DEF at its recommended storage and use temperature. Until now, each stationary or semi-stationary engine would have to be supplied with its own supply of DEF. The present disclosure teaches the use of a single supply tank for DEF. In the inventive arrangement, a single DEF supply tank can be and remain heated by the multi-port, remote filling system. Each stationary engine automatically receives heated DEF from the single, heated, DEF supply tank on an as needed basis.

This arrangement avoids the expense of man hours to monitor and refill DEF reservoirs. Further, this approach conserves energy, especially in cooler climates. Other additives may also be administered via a single additive supply tank supplying the additive to each engine separately. In some cases, only the additive supply tank would require heating or cooling or special storage conditions in this arrangement, increasing the efficiency of the re-supplying and maintenance operations.

Generally, then, the inventive multi-port remote filling system provides a system and automated method to provide one of a fuel or additive or other fluid (but in this embodiment, not both simultaneously) to multiple stationary engines thereby saving both money and energy, in addition to solving many other industry issues. In one alternative arrangement of the multi-port remote filling system, the system comprises a supply tank for DEF (preferably heated) and operates as an automated supplier of DEF (or other fluid) to the DEF reservoir in each of the associated stationary engines based on detected signals related to, or directly detected levels of, DEF fluid at each engine, providing DEF through a manifold arrangement or through individual conduits to the DEF reservoir of each engine as needed via fluid pressure maintained by the automated pump.

Alternatively, the system may comprise a supply tank of fuel and operate as an automated supplier of fuel to the fuel reservoirs of each of the associated stationary engines in response to each engine's individual need for fuel. Fuel levels in the fuel reservoir of each associated engine may be associated with a detector/signal and fuel can be separately supplied to the fuel reservoir of each stationary engine as needed by that engine. It is likewise conceivable that a single system might serve multiple stationary engine needs, e.g., separate supply tanks and separate supply lines for fuel and for additives to be provided to fuel tanks and to additive reservoirs respectively, where the processor processes signals/switches and accommodates the indicated needs of the individual engine by maintaining or implementing pressure in fluid lines and opening or closing the necessary respective valves.

The use of the present invention is not limited to fueling principally stationary engines and should, instead, be understood to have application in many situations. Where several engines may be located away from one or more of a functioning power grid, electricity, and/or a fuel source, and permanently or semi-permanently located remotely from a fuel and/or liquid additive source, and that engine is required to run for long periods of time there is likelihood that these engines will require additional fuel or additive at that location before the engine's intended function is fulfilled.

The use of the present invention is not limited to fueling principally stationary engines and should, instead, be understood to have application in any situation wherein an engine is permanently or semi-permanently located remotely from a fuel source and comprises a fuel tank that has a likelihood of requiring additional fuel at that location before the engine's intended function is fulfilled.

BRIEF DESCRIPTION OF THE DRAWINGS

FIG. 5 shows a first side view of a tank interface assembly with cover on;

FIG. 6 shows a front view of the tank interface assembly with cover on;

FIG. 7 shows a second side view of the tank interface assembly with cover on and associated with the reservoir 14 depicted in cutaway view;

DETAILED DESCRIPTION OF THE INVENTION

Figure 1:
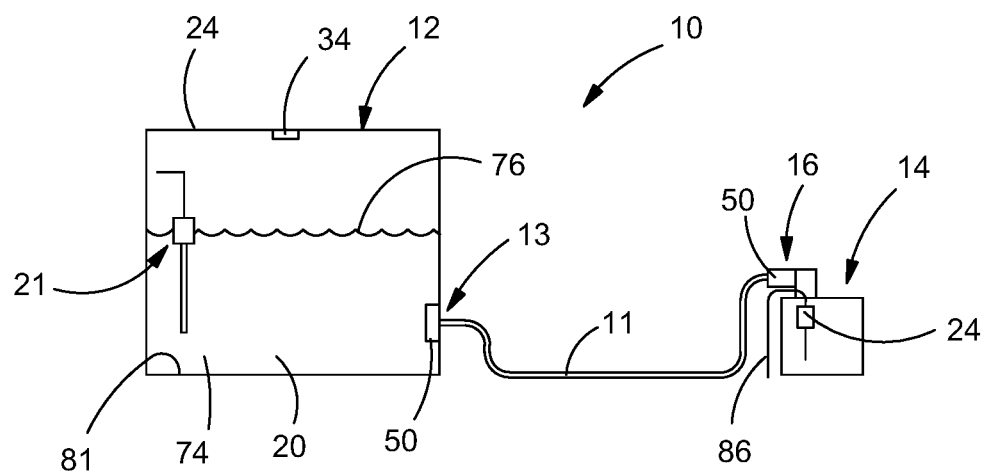
FIG. 1 is a schematic showing a first embodiment of the remote filling system.

Example embodiments will now be described more fully with reference to the accompanying drawings, in which example embodiments of the remote filling system are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another elements, component, region, layer, and/or section. Thus, a first element component region, layer or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures. For example, if the structure in the figures is turned over, elements described as "below" or "beneath" other elements or features would then be oriented "above" the other elements or features. Thus, the exemplary term "below" can encompass both an orientation of above and below. The structure may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures exemplify specific shapes or regions of elements, and do not limit example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a fluid delivery system equipped with at least one and, commonly more than one, storage tank to house at least one kind of fluid, means to move a fluid either into or out of said storage tank, and commonly, into another tank.

The present inventive multi-port remote refilling system 10 drastically reduces the need for human interaction in a refill delivery operation and comprises an assembly having, generally, a supply tank 12 which typically comprises a tank empty and may or may not comprise multiple chambers (see FIGS. 1, 2) Said supply tank 12 may, e.g., serve as a container for fuel 20 or additive 28 or other fluid 19. The system further comprises at least one reservoir 14 which may be used to contain fuel 20 or additive 28 delivered to the reservoir 14 from one of the supply tanks 12 through a tank interface assembly 16. The supply tank 12 and reservoir 14 may be of comparative or disparate sizes and fluidly connected through the tank interface assembly 16 and a conduit or conduits 11. The remote filling system 10 automatically delivers fluid 19 (which may be any of fuel 20 or additive 28) to the reservoir 14 as needed and from supply tank 12, or, in the presently described embodiment, the tank interface assembly 16 may be associated with the reservoir 14 and may facilitate transport of fuel 20 or other fluid 19, 28 to the reservoir 14 with or without human interaction. Delivery of fluid 19 is provided via pressure generated by a pump 32. (See FIG. 3, 4). The present inventive multi-port remote refilling system 10 is not limited to only one main supply tank 12 and one reservoir 14, but may comprise multiples of each wherein material in a supply tank 12 is conveyed via direct conduit 11 and fluid pressure to tank interface 16 to an intended engine's 23 associated reservoir 14 or, alternatively delivered first to a manifold 18 comprising more than one port (see FIGS. 3 and 16) and, thereafter, to one or more reservoirs 14 each fluidly associated with the engine 23 of one or more of machines 22 via conduit 11 or other fluid transporting means. See e.g. FIG. 2.

Figure 16:
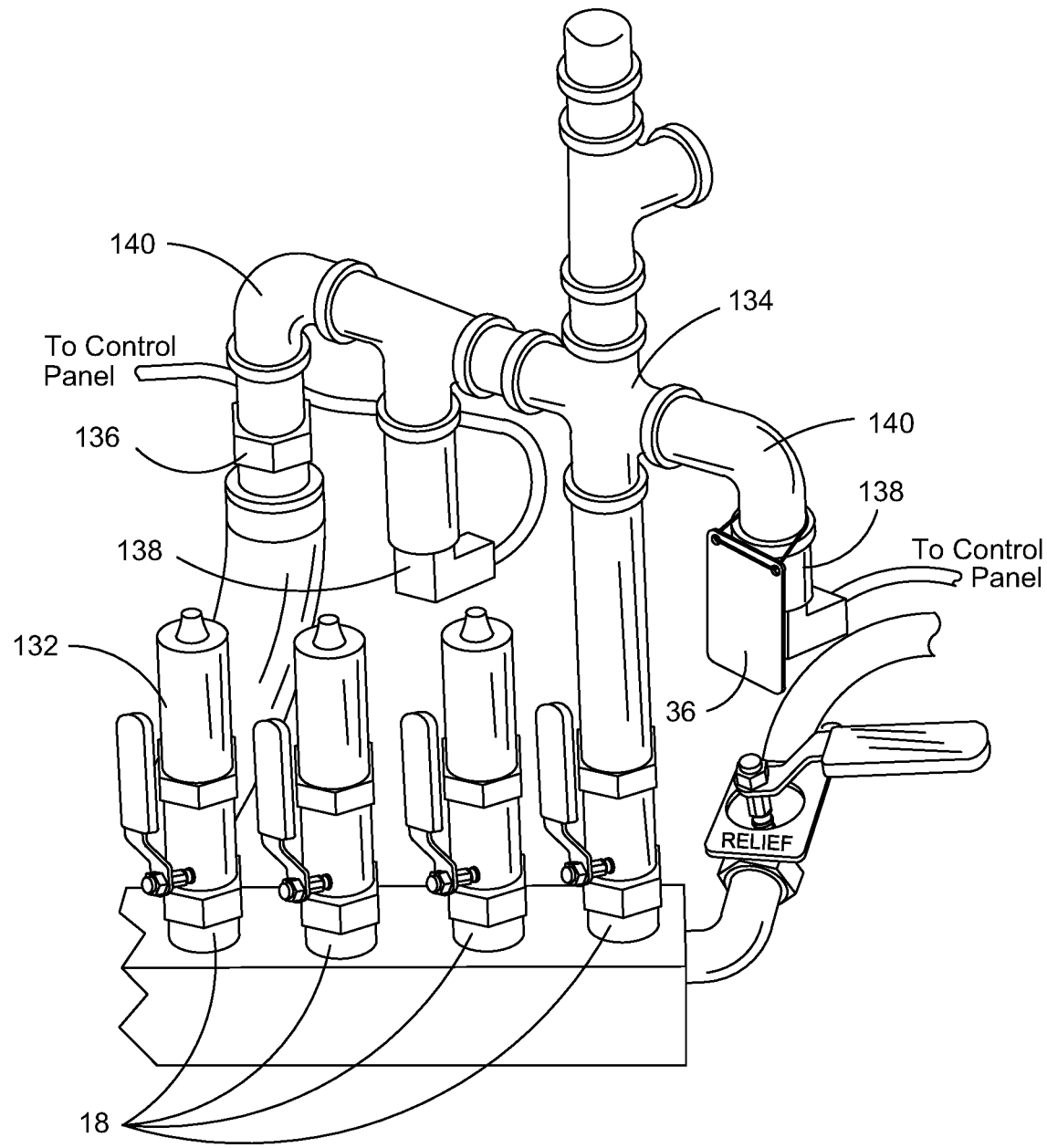
FIG. 16 shows a close up perspective view of a portion of the manifold along with a "tee" and check valve with two elbows.
Figure 17:
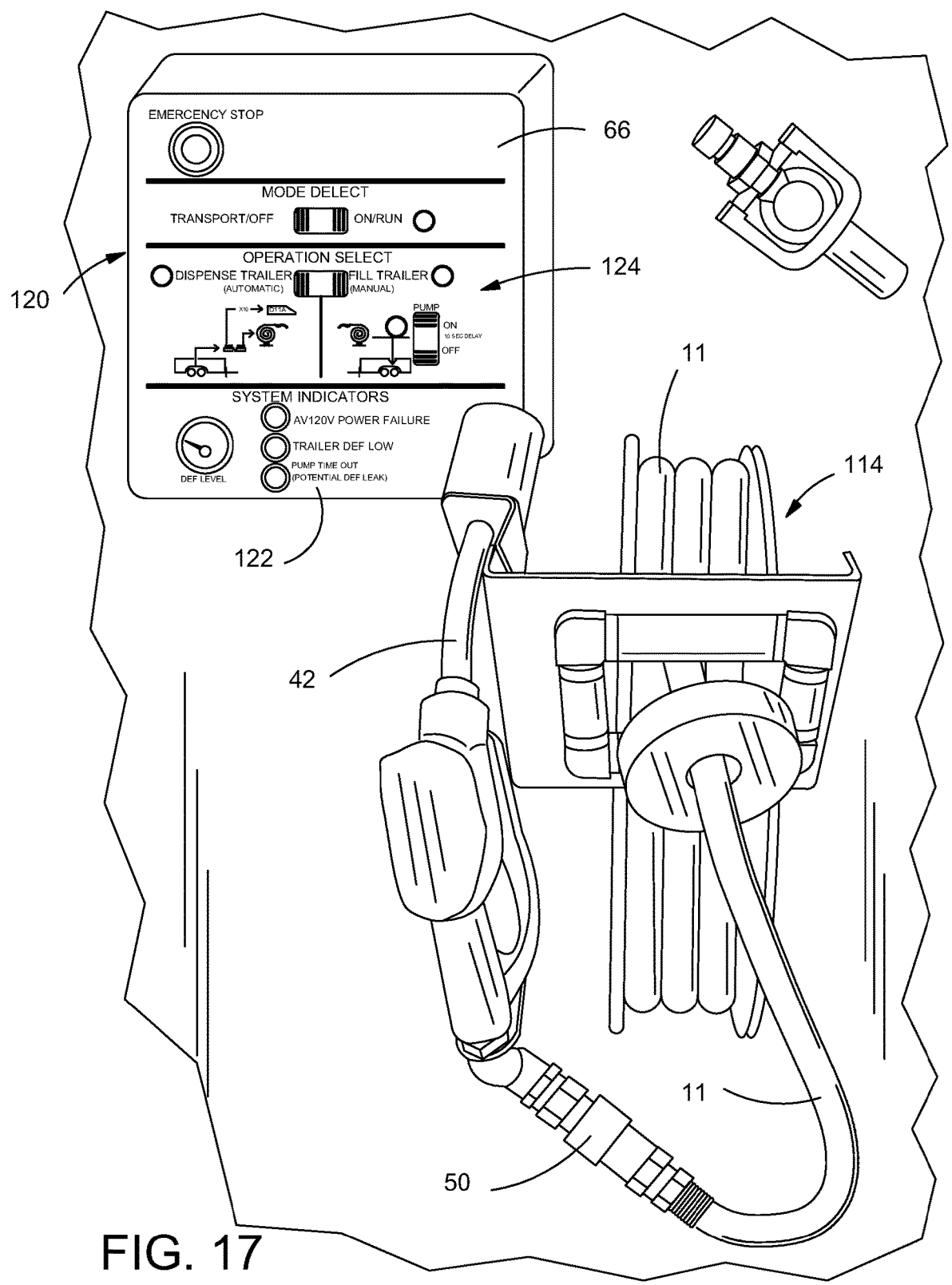
FIG. 17 is a view of the conduit, reel and nozzle assembly and the control panel in the control box.

Manifold 18 and check valve 136 are shown at FIG. 16 comprising right and left elbows 140 and ports (132) and is provided for the purpose of changing the direction of flow. Each elbow 140 has a pressure sensor 138. Generally, as is known in the art, a tag 36 may be associated to certify set pressure. The multi-port manifold 130 has two 4-way valves 134 to control direction of flow from and to the pump 32 .e.g., changing from a direction causing fluid 19 to fill one or more reservoirs 14 to a different direction that causes fluid 19 to flow out of one or more reservoirs 14. In one embodiment, the four-port manifold 130 can be located in front of the ten-port manifold 18. One embodiment the four-port manifold 130 includes two 4-way valves 134 to facilitate change in fluid flow direction. The four-port manifold 130 has 4 way fitting 135 which may comprise a check valve 136 and two pressure switches 138 see FIG. 16. When pressure in the manifold 130 decreases enough it triggers one of the pressure switches 138 which activate the pump 32 to deliver fluid 19. When the pressure in the manifold 130 is restored, the other pressure switch 138 is triggered thereby deactivating the pump 32. The valves 134 are the 4 way valves that change direction of flow of fluid 19 through the pump 32 changing the direction of pressure, resulting in change of direction of fluid flow.

Manifold 18 and ports 132 and check valve 136 are shown at FIG. 16 comprising right and left elbows 140 and are provided for the purpose of changing the direction of flow. Each elbow 140 has a pressure switch 138. Generally, as is known in the art, a tag 36 may be associated to certify set pressure.

The four-port manifold 130 has two 4-way valves 134 to control direction of flow from and to the pump 32 e.g., changing from a direction causing fluid 19 to fill one or more reservoirs 14 to a different direction that causes fluid 19 to flow out of one or more reservoirs 14. In one embodiment, the four-port manifold 130 can be located in front of the ten-port manifold 18. One embodiment of the four-port manifold 130 includes two 4-way valves 134 to facilitate change in fluid flow direction. The second manifold 130 has 4 way fitting 135 which may comprise a check valve 136 and two pressure switches 138 (refer to FIG. 16). When pressure in the manifold 18 decreases enough it triggers one of the pressure switches 138 which activates the pump 32 to deliver fluid 19. When the pressure in the manifold 130 is restored, the other pressure switch 138 is triggered thereby deactivating the pump 32. The valves, 134 allow and facilitate change in the direction of flow of fluid 19 through the pump 32 changing the direction of pressure, resulting in change of direction of fluid flow.

Generally, the supply tank 12 is on-site at the remote location and would have a large capacity and be refilled by a supply truck or mobile tanker as are known in the art. The fuel 20 (or additive 28) (each also referred to as a fluid 19) from the supply tank 12 may exit through an opening 13 associated with a conduit 11 which, in at least one embodiment, feeds a manifold 18 (See FIG. 3) or may exit through individual conduits 11 (FIGS. 1 and 2) each conduit 11 preferably controlled by a valve 54 or valves similar to valves 54 in FIG. 3. In one embodiment, the supply tank 12 is fluidly associated with a micromatic suction nozzle 42 via a quick coupler 50 (see, e.g., FIGS. 11 and 12). This arrangement is employed to load fluid 19 into the tank 12. The suction nozzle 42 can be easily disengaged from the quick coupler 50, allowing the quick coupler to associate a fluid nozzle (see, e.g., 42), which can, in turn, be used to dispense fluid 19 selectively.

In the manifold arrangement (see FIG. 3), via pressure provided by the pump 32, the fluid 19, 20, or 28 from the supply tank 12 would exit through the fluidly connected manifold 18 and feed the plurality of conduits or pipelines 11. One embodiment comprises automated filling of multiple reservoirs (or refill tanks) 14 by the manifold 18, fluidly connected to the plurality of pipelines 11. This embodiment could include a computing device or CPU 60 having a processor 52, a wireless network 29 and set of valves 54 each operated by the processor 52 via signals communicated via the wireless network 29. (See FIGS. 2 and 3). This embodiment may further include remote display 67 and user interface (control panel) 66.

Processor 52/60 is a component capable of receiving signals 27. Those signals 27 may be generated by a sensor 24 and may relate to, for example, the fluid 19 level in a reservoir 14 or in supply tank 12. Temperature signals may also be important in some applications. This signal 27 may be via an antenna or may be a hardwired signal or other method of communication available as known in the art.

Processor 52 is configured to facilitate processing of information in association with a computing device 60, comprising memory 62, software 64 and a user interface (control panel) 66. Processor 52 may be a single component, such as a microprocessor chip, or alternatively processor 52 may be formed of a plurality of processing components that are connected to one another that may be co-located or located at different geographic locations. See FIG. 2, for example.

Processor 52 sends and receives information and instructions. In one arrangement, processor 52 receives a signal 27 from sensor 24 and processes this information pursuant to instructions or software 64.

Processor 52 may be capable of receiving and processing a plurality of signals 27 from a plurality of sensors 24. The signals 27 may come from a plurality of reservoirs 14 or supply tank 12. Similarly to the embodiment shown at FIG. 2, in the example at FIG. 3, processor 52 may be responsible for controlling a plurality of solenoid valves 86 to control fluid flows to a plurality of tanks 14. While a solenoid valve 86 is used in the example, any type of a valve 54 is hereby contemplated for use. Valve 54 is any valve capable of allowing and disallowing the flow of fluids. Valve 54 is capable of control by any means including, but not limited to, a processor 52 controlling an electric circuit and/or a manual switch.

Figure 2:
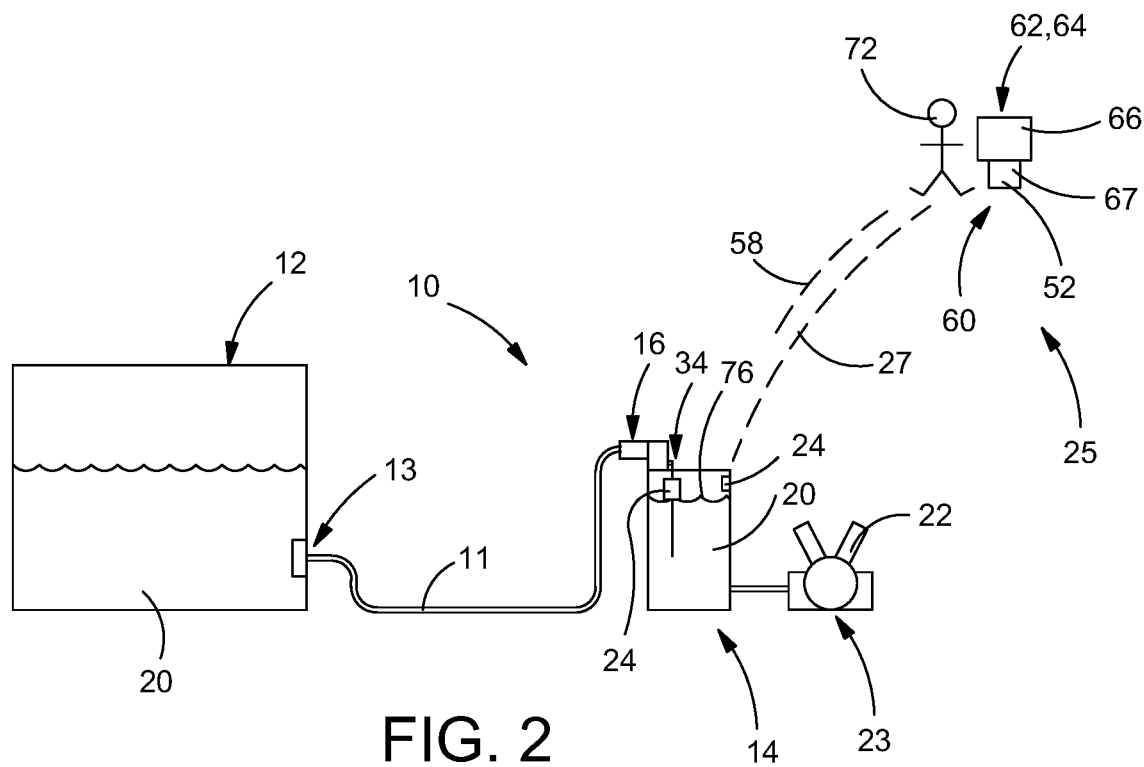
FIG. 2 is a schematic of the remote filling system associated with a machine engine.

Sensor:

In the arrangement shown, as one example, system 10 includes the sensor 24 (see FIG. 2). The specific input to sensor 24 may be light, heat, motion, moisture, pressure, or any one of a great number of other environmental phenomena. Sensor 24 is a device, module, or subsystem that detects changes in its environment and sends a signal accordingly to other electronics, frequently a computer processor 52. In one application, the output of sensor 24 is a signal that is generally converted to human-readable display by processor 52 and made visible by the remote display 67. Both analog sensors and/or digital sensors are hereby contemplated for use. In one arrangement, sensor 24 and/or micro-sensor sends information to the processor 52 for use in determining whether or not to open a valve 54.

Each of the plurality of conduits 11 may have an operative, fluid connection to the supply tanks 12 or to one or more reservoirs 14 which may, in turn, each be fluidly connected to one or more stationary machines 22. Referring to FIG. 2, the remote filling system 10 may comprise the user interface (control panel) 66, remote display 67, the computing device (CPU) 60 comprising processor 52 and a receiver 65 and memory 62 for running software. The CPU 60 receives and processes signals 27 related at least to fill and full statuses related to one or more reservoirs 14.

The control panel 66 may function in either of two ways. In short, the control panel 66 controls the fluid level warning device in tank 12 (which may comprise a sender 80/float 82 combination or pressure switches as discussed herein), and all three of the 4-way valves 134 which control the direction of flow for filling, loading and operation mode. The first way comprises employing a series of relays, switches and controllers selected to provide indications relative to full status of each of the reservoirs 14, triggering refill and stop fill based solely on the status of the switches. The operation of such relays and switches is known in the art. This first functional description offers some advantages where the system 10 may be operating in harsher working conditions or climates and where refilling and use will likely be performed by less skilled workers.

The second way is with a processor 52. Employing a processor 52 eliminates most relays and switches. Programming the processor 52 of a laptop to control the fluid level by detection of the level of fluid 19 in the reservoirs 14 and triggering refill may be more expensive and, perhaps, more complex in some ways. However, employing a processor-controlled approach allows the operator the ability to change, adjust, and fine tune how the unit functions providing higher efficiency or alternative uses.

Fuels 20 can be consumed by the machines 22 described herein. The system 10 includes means to communicate 25 (to be discussed herein) and may include said remote displays 67 to communicate the status of the system 10 and allow for interaction so an operator 72 may instruct the remote filling system 10 to perform certain functions. As a specific example, processor 52 of the computing device 60 of the system 10 may detect/receive signals 27 that indicate a full/empty status 15 of each of the reservoirs 14. Upon receipt of said signal 27, the system 10, by way of said computing device 60 and means to communicate 25, may also send signals 27 that actuate means to initiate 31 and/or complete refilling of one or more of the reservoirs 14 (See FIG. 3). Means to initiate 31 may include computing device 60 which may include but is not limited to the wireless transmission of signal 27 sent to the receiver 67 over a network 29 which may be wired or wireless, as is known in the art. Signals 27 may be generated by a plurality of sensors 24 that are indicative of fluid levels (FIG. 2, and as known in the art, e.g., floats and senders, or pressure switches).

Figure 18:
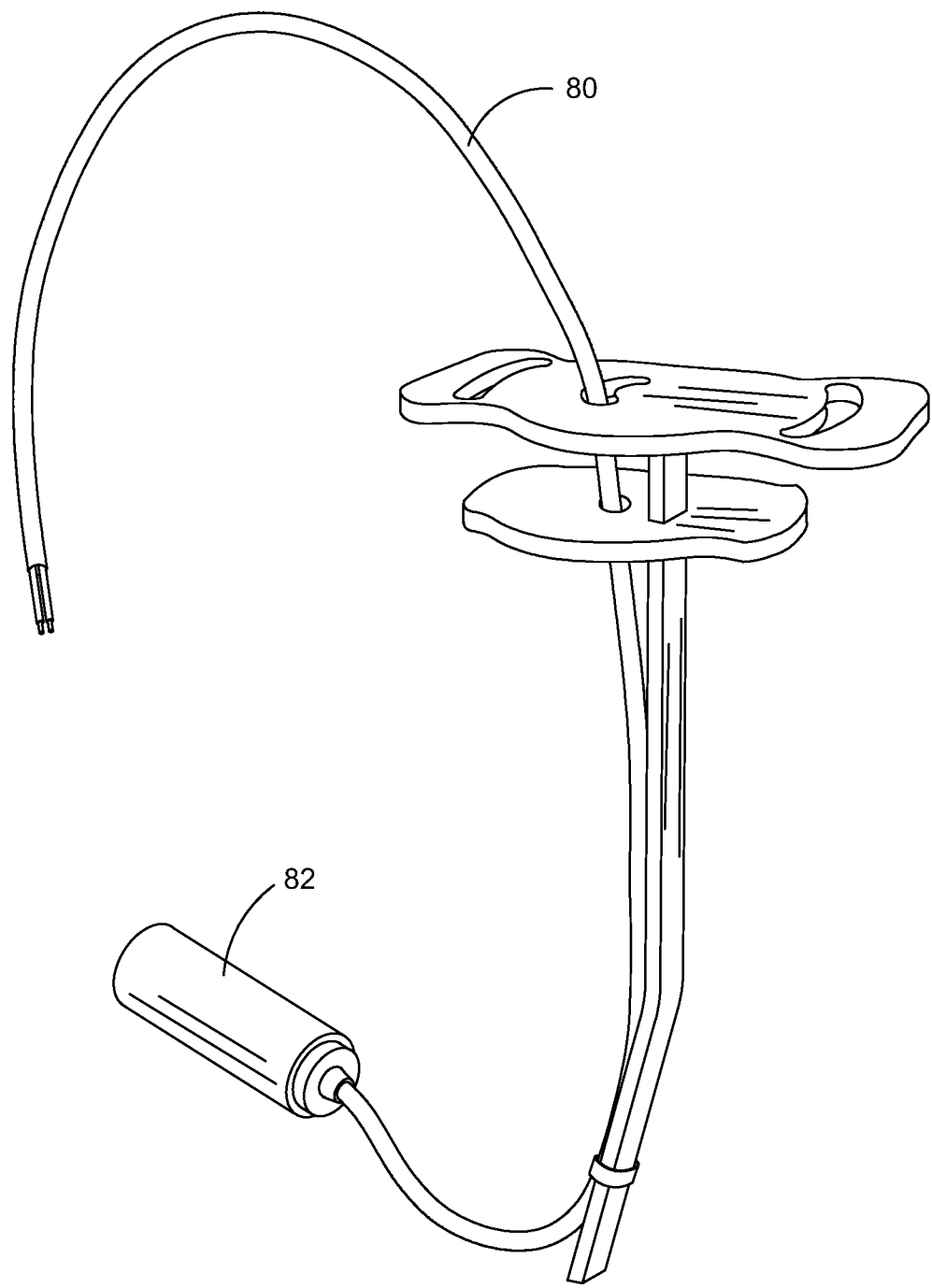
FIG. 18 is a perspective of an example float and sender assembly.
Figure 19:
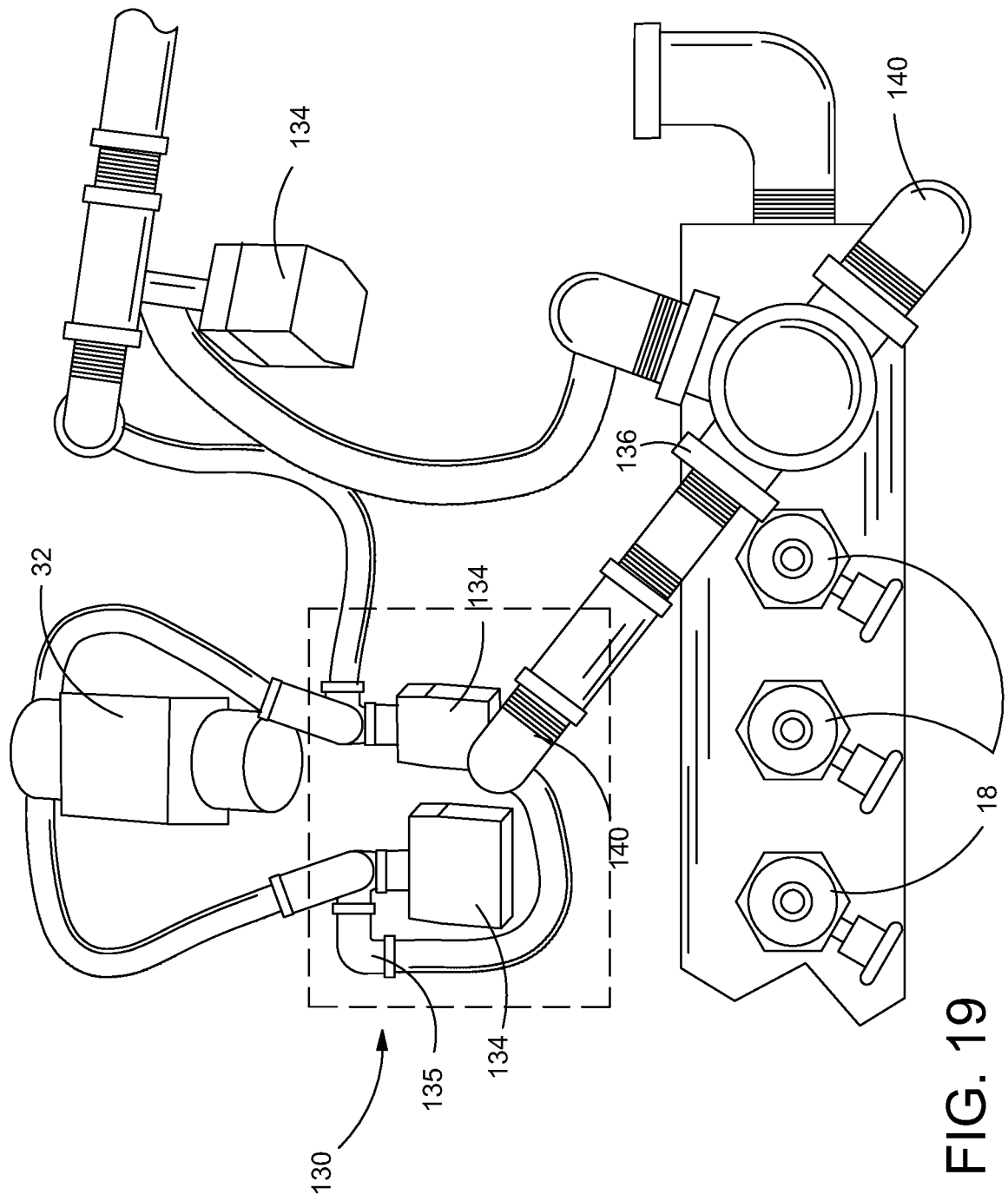
FIG. 19 is a plan view of a portion of the manifold, and of the four-port manifold, and the tee and 4-way fitting with two elbows of FIG. 16

Optionally, signals 27 in operation may be received and processed by processor 52 associated with the computing device 60 which communicates with the wireless network 29. The processor 52 may receive signals 27 from sensors 24, based on, e.g., a float 82 and its location within tank 12 (see FIG. 3). These signals 27, would notify the user interface (control panel) 66 of the tank's 12 status of full and/or empty and/or refilling, to be more fully described herein. These communications may incorporate identification of each of a plurality of supply tanks 12 and/or a plurality of reservoirs 14 statuses. The communications may also provide other useful user data and may be wireless, wired, or otherwise facilitated. In some embodiments, control panel 66 may provide selective means to switch on or off the Each reservoir 14 has at least one direct connection to supply one of fuel 20 or additives 28 (but not both simultaneously since contaminating one with the other may damage the machine 22) to the stationary machines 22, FIG. 2, which keeps the machines 22 running. When a reservoir 14 gets low on fuel 20, which happens approximately once a day in many operations, in one embodiment a fluid level sensing device sensor 24 (see FIG. 2) within the reservoir 14 causes a signal 27 to be sent by a signaler, and then received by the processor 52/60 which, in turn, opens the direct valve 54 (See FIG. 3) (which may be a solenoid valve) to the correct conduit 11 allowing fluid 19 (which may be, for example, any one of fuel 20, additive 28, or other fluid 19), to flow from the supply tank 12 to that reservoir 14. Sensor 24 may, for example, comprise a sender 80 and a float 82 as is known in the art (and with example shown at FIG. 18) or may comprise electronic detector/signaler combinations known in the art (see, e.g., FIGS. 2 and 6). One example of a sender 80/float 82 assembly is depicted at FIG. 18 and may comprise a float switch having a micro-switch with switching ball, and change-over contact where the float may be made of polypropylene and the switch angle may be, for example (as measured against the horizontal): upper switch point +25°+/−10°, lower switch point −14°+/−10°. One such float switch is offered by Perrperl+Fuchs Group, model LFL2-CK-U-PUR5-EMS. This description is not provided as limitation but only for exemplary purposes.

The sensor 24, within the reservoir 14, causes a signal 27 to be sent to the processor 52/60 to close the valve 54 (FIG. 3) when the reservoir 14 reaches a pre-determined full and/or pressure level. That signal 27 may be the result of a position of a float 82 which may trigger a physical or electrical switch 34 as is known in the art and to be more completely described herein. In another embodiment, the signal 27 is generated directly by a pressure switch 34 or lever where the lever has a position. The lever's position is physically switched by the physical effects of high liquid or gas pressure and low liquid or gas pressure which is, in turn, caused by fluid level 76. For example, sensor 24 may comprise a pressure-sensitive binary valve 24 (see FIG. 2); the valve is in fluid communication with the fuel 20 in the reservoir 14; as the fuel 20 is used and its level lowered, pressure holding the valve 24 closed may be diminished allowing the valve 24 to open and inflow fuel 20 to replenish the supply. As the fuel 20 is replenished, the fuel level rises. The rising fuel 20 provides pressure on the valve 54 triggering it to close and shut off fuel 20 flow into the reservoir 14. Thus, the remote filling cycle is complete without any necessary human or operator interaction.

In an alternative, the present invention may be operated in reverse. In the reverse embodiment, a series of tanks could be used to fill a single tank. In that case, a sensor in the single tank detects a level of fluid as too low; the processor receives a signal from the sensor then opens one or more valves, each associated with one of the series of tanks to allow refill of the single tank employing negative pressure to move the fluid. Refill can be sequential or, multiple reservoirs can refill simultaneously.

In one arrangement shown, e.g., in FIGS. 5-10, tank interface assembly 16 comprises said sender 80. Sender 80 is formed of any suitable size, shape and design to facilitate interaction with the reservoir 14. Sender 80, in the arrangement shown, may be an elongated, cylindrical member that extends downward into the reservoir 14. Alternatively, sender 80 may be embodied as previously discussed and shown at FIG. 18. Sender 80 is generally designed not to reach the bottom of the reservoir 14 but may be adjusted based on the depth of the particular reservoir 14 in which the sender 80 is in operation. Sender 80 is operationally associated with the tank interface assembly 16. Sender 80 may be of any configuration including, but not limited to, cylindrical which will facilitate the intended function of sender 80 in the present disclosure.

In the arrangement shown, as one example sender 80 has a float 82 associated with the sender 80. Float 82 is configured to facilitate in the measurement of the fluid level 76 within the reservoir 14. Float 82 may be slidably associated with the sender 80 allowing the float 82 to move vertically along the sender 80 with the surface of the fluid 76 on which the float 82 floats. In the arrangement shown, as another example, float 82 is affixed to sender 80. Float 82 is formed of any suitable material to maintain a positive buoyant property which displaces enough fluid 19 to raise the sender 80 which, in turn, deactivates the solenoid valve 86 and, in turn, shuts off fuel flow. As fuel is used, the surface of the fluid 76 lowers and the float 82 lowers thereby activating in-flow of fuel 20, on an as needed basis. There are many embodiments of sender and float arrangement known in the art, many associated with valves and signaling.

Similarly to the float and sender arrangement just described which is not driven by a processor or electronics, another physical change may cause the fluid 19 flow to start or stop, rather than an electronic or wireless signal. For example, fluid pressure may be physically associated with a lever; high pressure causes the lever to be located in a first position while low pressure causes the lever to be located in a second position. The first position may, in turn, trigger fluid flow while the second position stops fluid flow.

In another version, sensors govern flow of fuel or fluid 20. A sensor 24 detecting presence or absence of fluid at a certain volume or depth will send a signal 27 (FIG. 2) to the processor 52 indicating the supply tank 12 is low and/or empty and the processor 52 turns on fuel flow via the tank interface assembly 16 to be more fully described herein. When the fluid 20 level 76 within supply tank 12 reaches a pre-determined full level, then sensor 24 will send a second signal 27 to processor 52/60 indicating fluid 20 flow to the supply tank 12 should stop. The processor 52/60 turns off fuel flow causing flow to stop and then records completion, and amount transferred by means known in the art.

The supply tank 12 is generally considered the source of fuel or fluid 20 in this refill device. Supply tank 12 will supply the fluid 20 to the reservoir 14 and or plurality of reservoirs 14 by means of the tank interface assembly 16. In one embodiment, the tank interface assembly 16 is capable of autonomously governing fluid flow by engaging or disengaging the flow of fuel 20 in response to signals or commands generated by the remote filling system processor 52. In the simpler version as previously described, the position of a float 82 is associated with a switch 19 governing flow of fuel; tripping the switch 19 activates or deactivates the tank interface assembly 16 as needed.

The embodiment of the invention which comprises remote filling using processor 52/60 (FIG. 2) is just one example of the internal communications taking place within the system 10. Additionally, processor 60/52 may send signals 27 which cause a valve 54 to open or close when the processor 60/52 receives signals of low or high fuel 20 levels in a reservoir 14, (or low or high additive 28 levels when the system is employed with additives) where full level signals are generated by means well known in the art and previously discussed herein. Alternatively, these communications can originate externally from a remote operator 72.

Supply Tank:

In the arrangement shown, as one example, supply tank 12 is formed of any suitable size, shape, and design so as to facilitate the storage, the filling and/or removing of a fluid 20. In the arrangement shown, as one example, supply tank 12 acts as the main storage tank which stores the fuel 20 or additive 28, ultimately to be transferred to a reservoir 14 or a plurality of reservoirs 14.

Supply tank 12 has an opening 34 or operable device which would allow the supply tank 12 to be refilled by another source. Another source of fuel or additive 20 may be a truck, tanker, and/or other source of fuel or additive, including a pipeline. Supply tank 12 also has an opening or operable device forming a tank empty 46. Tank empty 46 allows the supply tank 12 to be drained and/or emptied. A tank empty 46 is formed of any suitable size, shape, and design and is designed to facilitate the flow of fluid away from and/or out of the supply tank 12 as is known in the art. Tank empty 46 may be as simple as an opening with means to close where fluid can be poured or pumped from the tank. It may include a switch or switches, and possibly a nozzle access for a nozzle 42 connected to a conduit 11 and a fuel pump as is known in the art (See FIG. 12). Supply tank 12 might be emptied to another source such as another tank, container, fuel truck, fuel tanker, or other source, including a conduit and/or pipeline. Additionally, the opening or operable device of supply tank 12 may be the same opening through which the supply tank 12 is filled and emptied.

In the example shown, fluid 20 is a diesel exhaust fluid (DEF) for use in the automated DEF refueling system disclosed herein. However, fluid 20 may be any type of fuel or additive capable of being stored in a generally stationary supply tank or reservoir and transported via conduit to be used as an additive and/or fuel type of fluid which needs to be supplied to an engine. The present invention is meant to manage delivery and storage of a single fluid rather than multiple fluids simultaneously.

Supply tank 12 may comprise the tank fill 34 associated with the opening. A tank fill 34 is formed of any suitable size, shape, and design as known in the art and is designed to facilitate the fill of the supply tank 12. Tank fill 34 may be as simple as an opening with means to close and possibly a nozzle access for a nozzle 42 where fluid can be poured or pumped into the tank 12 via a quick coupler 50 associated with the conduit 11 on reel 114 (e.g., FIG. 12). Thereafter, upon removal of the nozzle 42, the quick coupler 50 could be associated with a micromatic suction nozzle as is known in the art. Upon activation of the pump, fluid from the supply tank 12 could be removed and transferred to one or more reservoirs 14.

Figure 3:
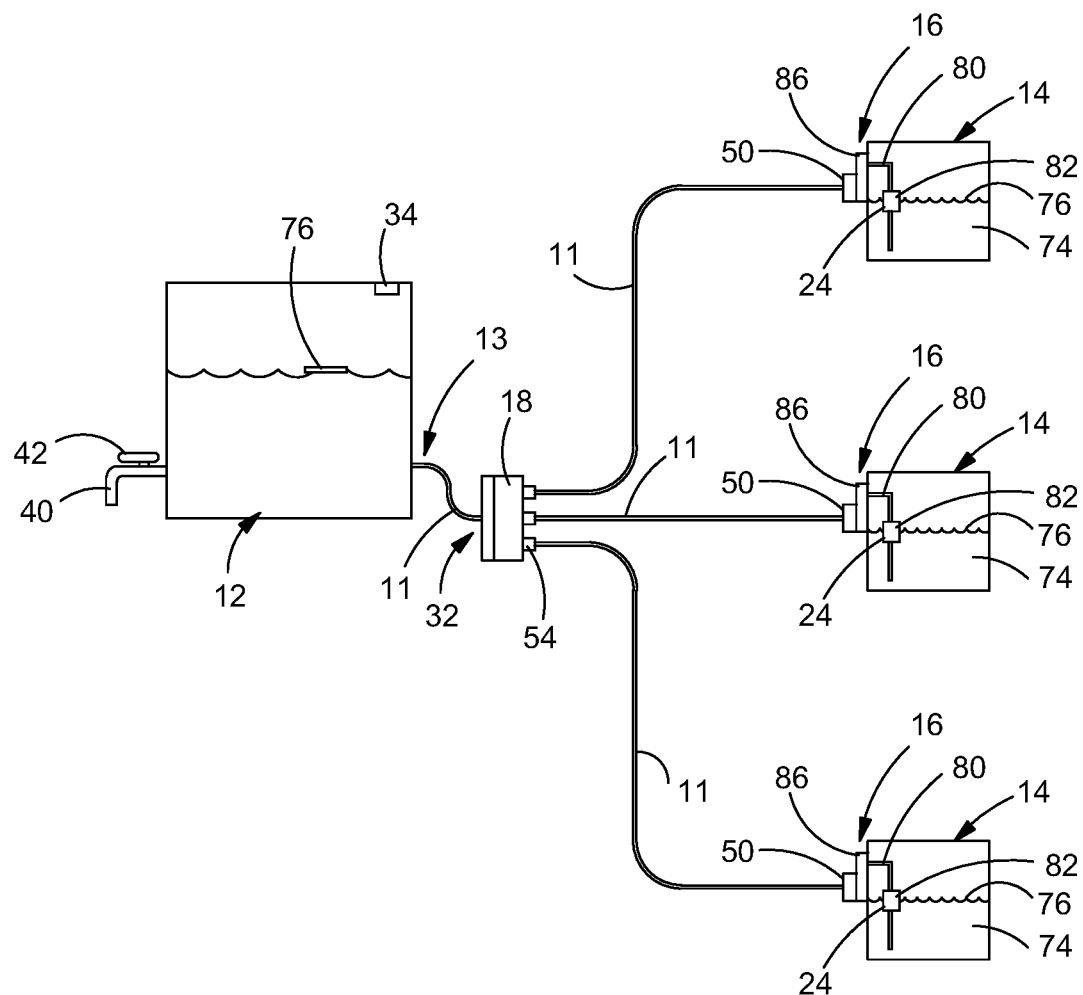
FIG. 3 is a schematic showing a second embodiment of the remote filling system supplying multiple tanks.
Figure 11:
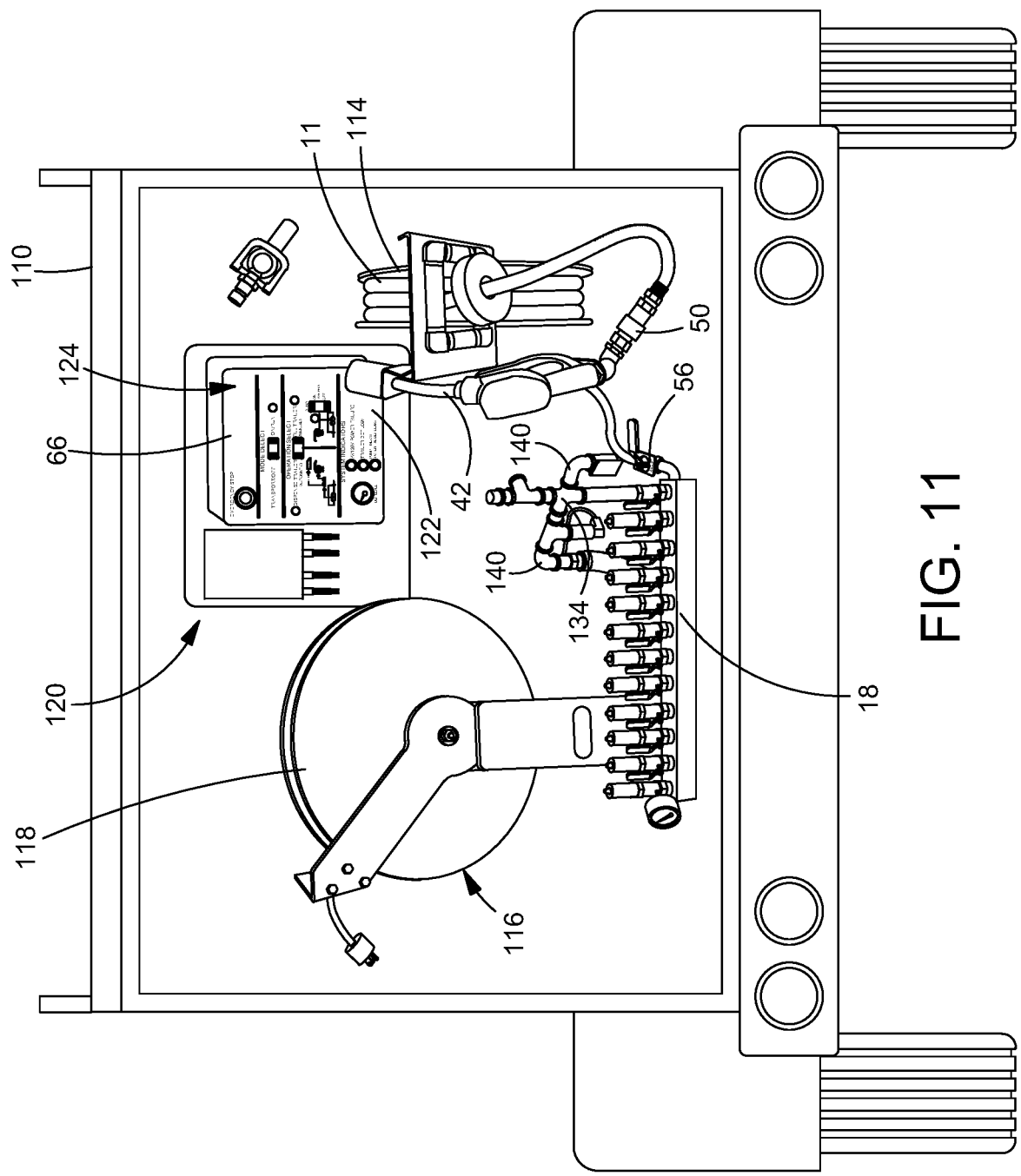
FIG. 11 shows an inside of a control box on the trailer 11 comprising a power cord and reel, a manifold, 4-way valve, a control panel, and a conduit reel, conduit, and nozzle.
Figure 12:
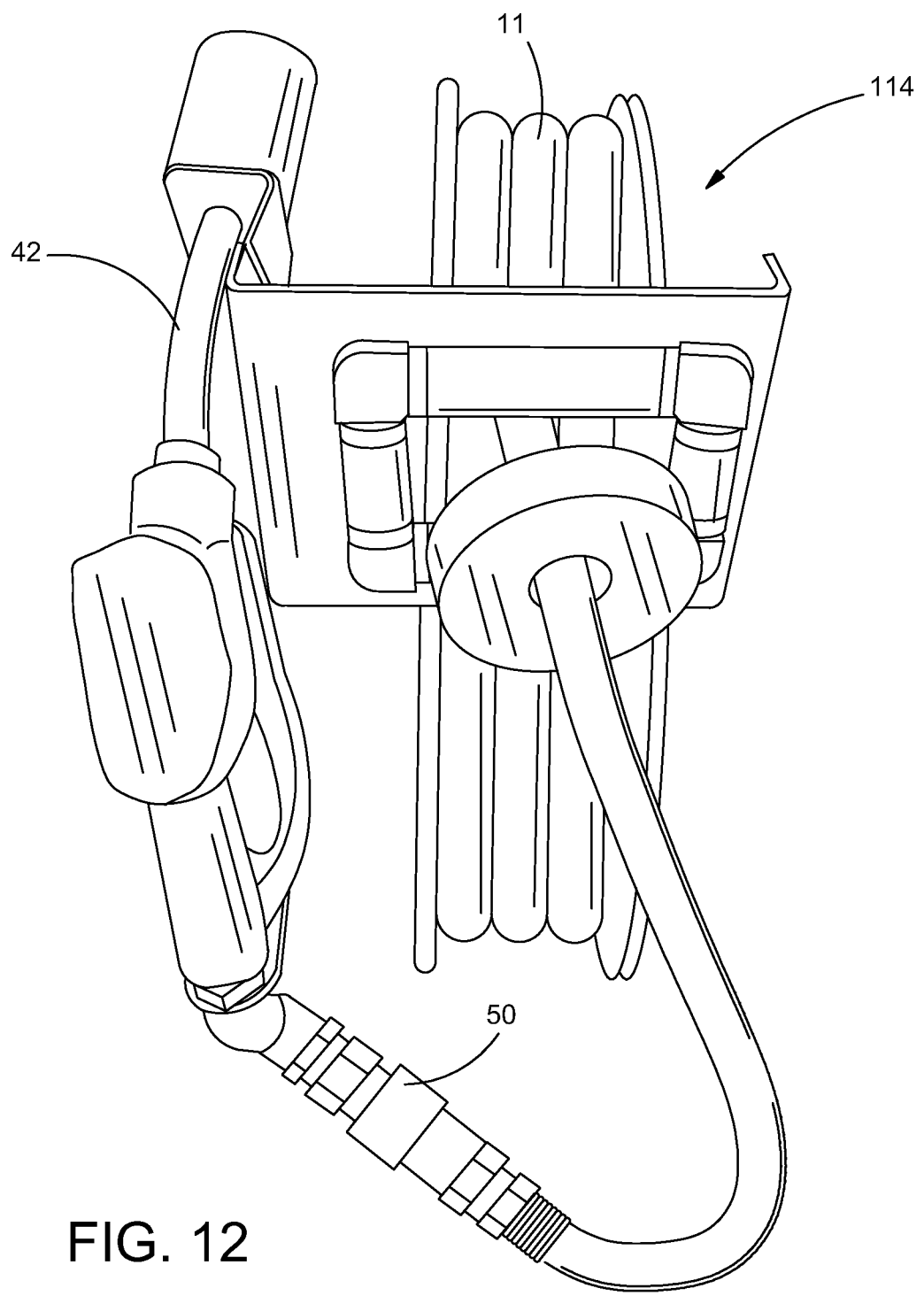
FIG. 12 shows an enlarged view of the conduit, reel and nozzle assembly in the control box.
Figure 13:
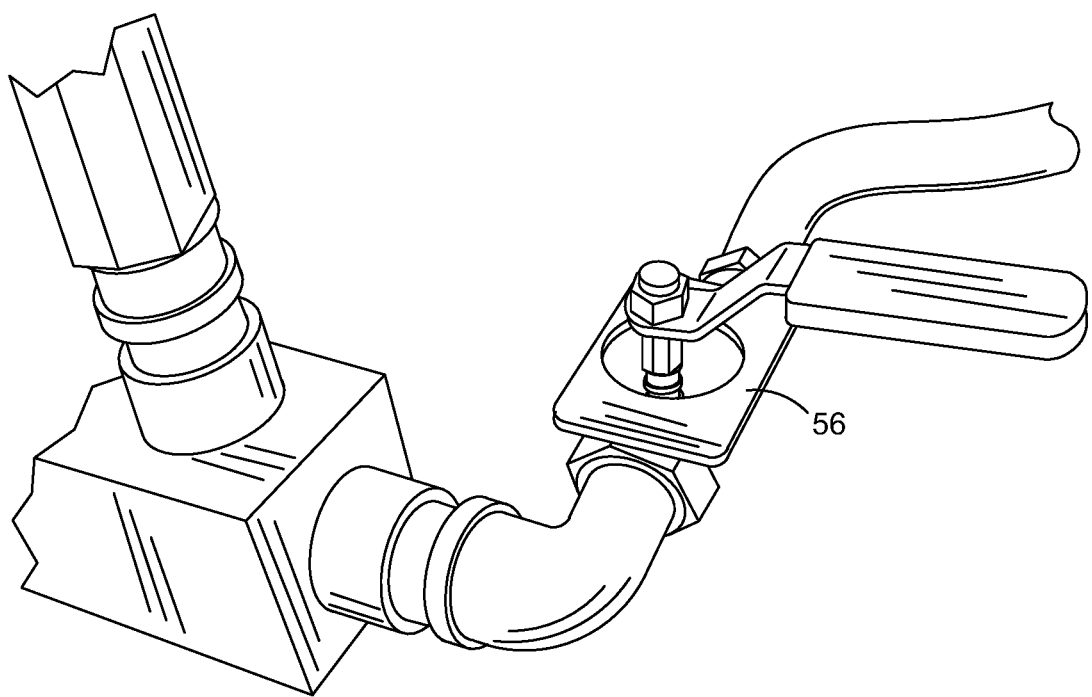
FIG. 13 shows a safety relief valve positioned between the manifold and conduit.
Figure 14:
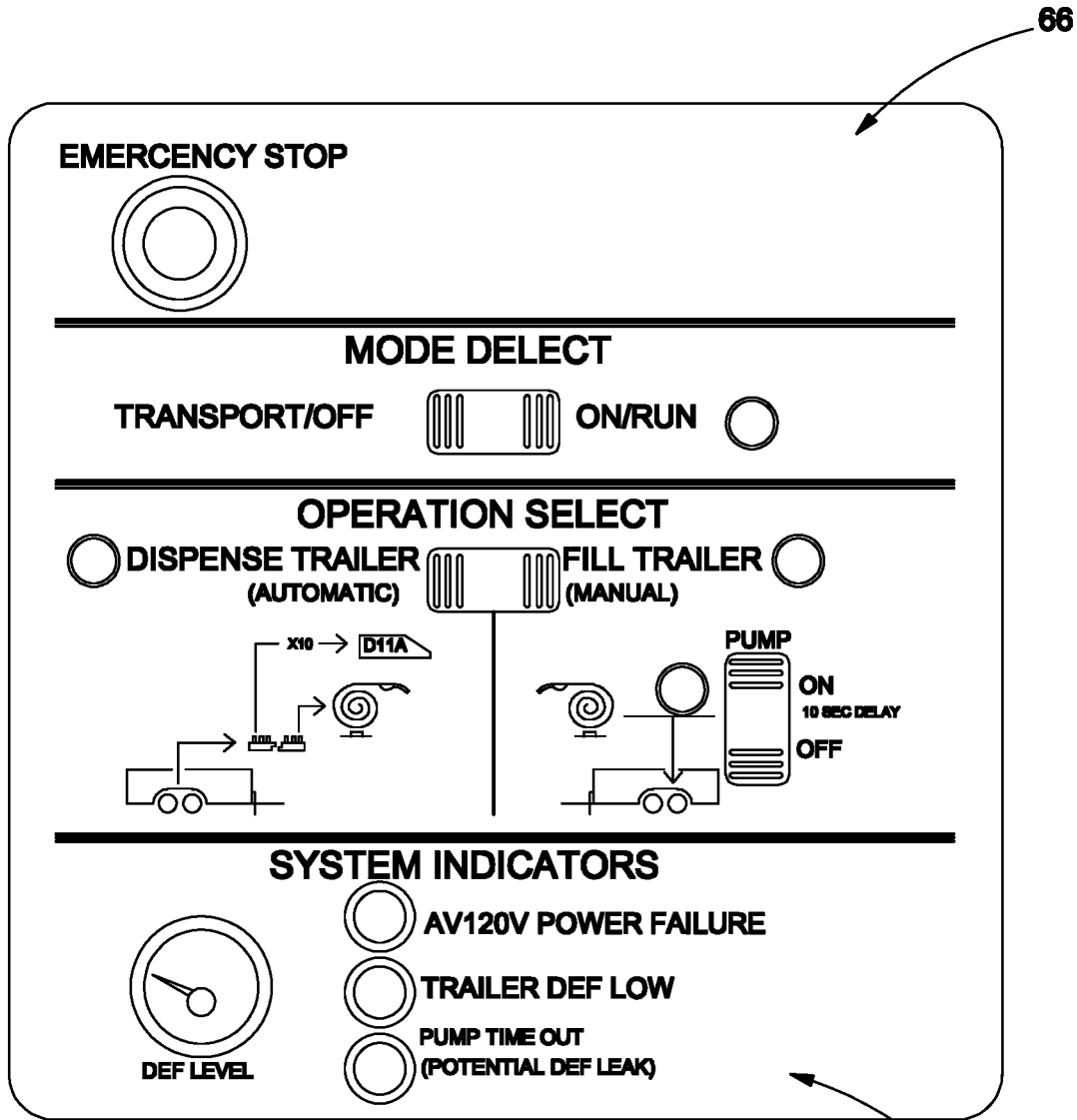
FIG. 14 shows the control panel in the control box.
Figure 15:
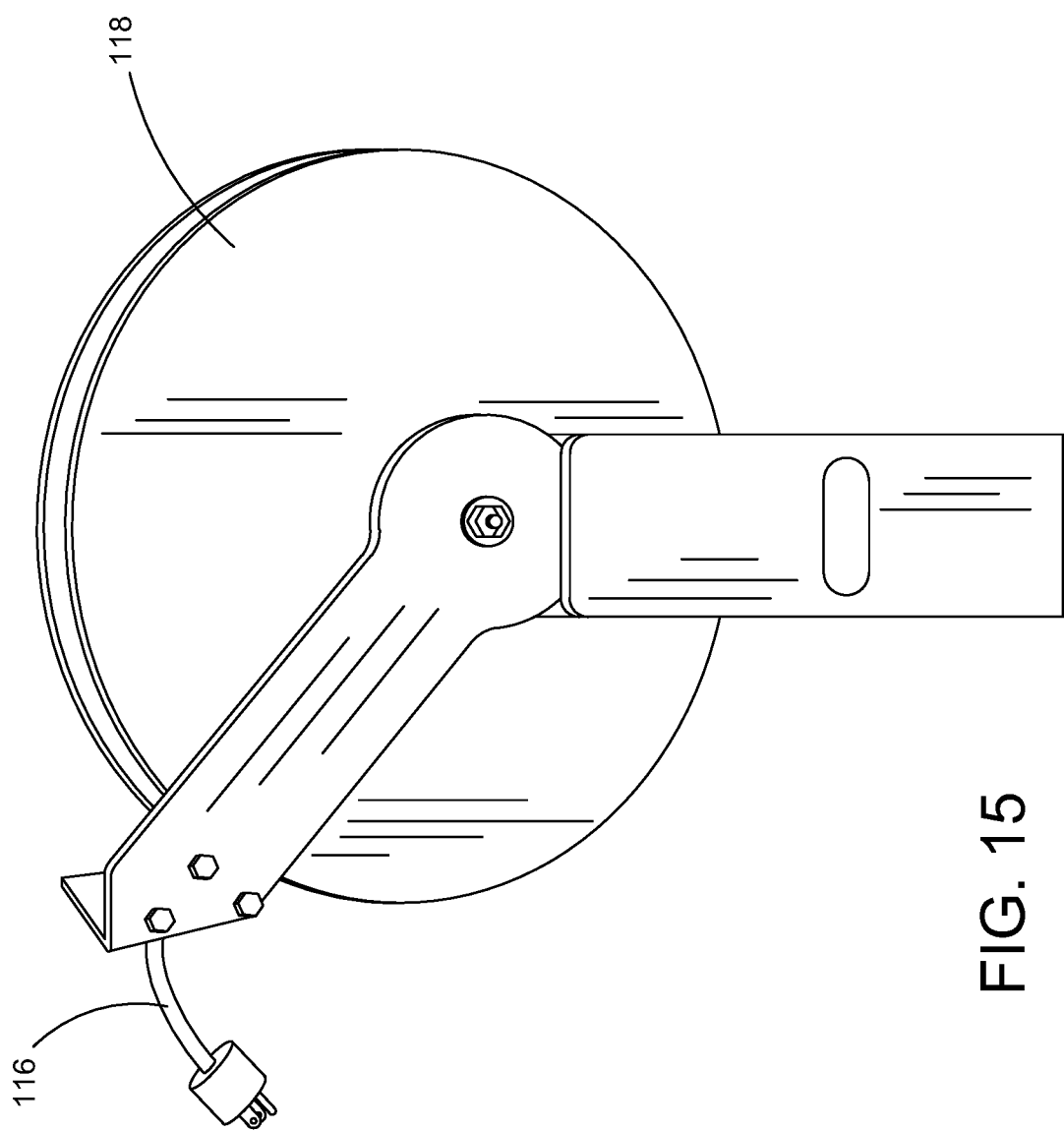
FIG. 15 shows the power cord reel which is positioned in the control box.

Referring now to FIGS. 3 and 11, tank fill 34 may include a fuel pump 32 (See, e.g. FIG. 3). Fuel pumps used at typical automobile fuel filling stations provide a prior art example of an arrangement of a nozzle access, nozzle, switches and pump assembly that could be used with the present invention for input of fluid/fuel to the supply tank 12.

In the arrangement shown, as one example, supply tank 12 is formed of one tank, however, supply tank 12 may be a plurality of supply tanks serving one or many other sources. Supply tank 12 may be a single holding tank or a holding tank with chambers or any other supply tank 12 as is desired for efficient supply.

Conduit:

In the arrangement shown as one example, conduit 11 serves as the overall connection which fluidly connects fluid 19 flow from the supply tank 12 to the tank interface assembly 16. Conduit 11 may be formed of any suitable size, shape, or design so as to facilitate the flow between supply tank 12, tank interface assembly 16, reservoir 14 and/or machines 22 (See FIG. 2).

In the arrangement shown, as one example, conduit 11 is a hose capable of attaching to a quick coupler 50 (as is known in the art) to facilitate the ease of connecting and disconnecting the conduit 11 to the supply tank 12 or the tanks 14 or to manifold 18. In the arrangement shown, as one example, conduit 11 has a female connection on at least one end which can attach to male quick coupler which may be located on the tank interface assembly 16 or directly to a manifold 18 or other location.

In another embodiment, in the arrangement shown, as one example, manifold 18 is formed of any suitable size, shape, and design and is formed to split a single supply line or single conduit 11, or single supply into a plurality of supply lines or a plurality of supply conduits. Manifold 18 may also be situated having a single line in and a single line out. In the example shown, the manifold 18 employs a processor 52 which may comprise a computing device 60, and at least one valve 54. However, one of skill in the art will understand there are several ways to manage the manifold.

As one example, the manifold 18 may be part of a utility box 108 which is mounted to a trailer 110, as may be known in the art. It should be understood that the term trailer may include a skid, a truck bed, a wagon, or any other platform or box appropriately sized to allow operation of the multi-port refilling system 10. Preferably, the platform or box (and the multi-port filling system associated with it) is easily transportable, however, some versions may be semi-permanently or permanently located. This arrangement allows for the manifold 18 to be moved from location to location and refill multiple tanks 14 at multiple locations. Although manifold 18 may be housed within the utility box 108, other locations of the manifold 18 are hereby contemplated for use. For example, manifold 18 may be mounted at the supply tank 12 location, reservoir 14 location, within the tank interface assembly 16, or near an additive tank 14 location.

Fuel 20 or other fluid 19 flows through the conduit 11 connected to the supply tank 12 to the tank interface assembly 16 and/or a manifold 18. The manifold 18 operates as is generally known in the art and more particularly described elsewhere herein and comprises valved openings 54 which each leads to separate conduits 11 which each transport fuel 20 or other fluid 19 into one of said reservoir 14. In one embodiment, DEF 30 flows from the manifold 18 to each reservoir 14 which, as shown at FIG. 2, may be the machine 22 DEF tank. Alternatively, the system may be used to distribute fuel rather than DEF or other additives.

Tank Interface Assembly:

In the arrangement shown at FIGS. 5-10, as one example, tank interface assembly 16 is formed of any suitable size, shape, and designed so as to facilitate the control of fluid movement from the supply tank 12 to the reservoir 14. Tank interface assembly 16 is designed to control the fluid flow from supply tank 12 to reservoir 14 in a manner which may be fully autonomous, requiring no human interaction.

In the arrangement shown, tank interface assembly 16 activates fluid flow from the supply tank 12 to the reservoir 14 after the tank interface assembly 16 has detected a low level of fluid 20 in the reservoir 14.

In the arrangement shown at least at FIGS. 5-9, as one example, tank interface assembly 16 comprises means to detect a level of fluid 19 in the reservoir 14 which includes, e.g., various combinations that may include one or more of a sender 80, a float 82, an adjustable base 84, a quick coupler 50, and a solenoid valve 86. The tank interface assembly 16 may be formed of any suitable size, shape and design which facilitates the detection of fluid levels 76 within reservoir 14 and actuates the valve 86 to refill reservoir 14 in a low state or actuates the valve 86 to close when a low level 76 of fluid 19 within a reservoir 14 returns to a high fluid level 76 state.

Fluid level detection may alternatively be accomplished via pressure-sensitive or may be moisture-facilitated, or may comprise other switching/contact mechanisms capable of reacting to a specific change in fluid level. There are multiple signaling means known in the art operating to indicate fluid level or changes in fluid levels.

In the arrangement shown, as one example, at FIGS. 5-10, tank interface assembly 16 has an adjustable base 84 which may be formed of any suitable size, shape and design and is designed to facilitate attaching the tank interface assembly 16 to the top of the reservoir 14. The tank interface assembly 16, in the arrangement shown at FIG. 7, as one example, is attached to the top of the reservoir 14. However, other locations for attachment are hereby contemplated. The tank interface assembly 16 may need to be affixed to the side or even the bottom of the reservoir 14 in some scenarios. In some scenarios where the tank interface assembly 16 needs to be affixed to the side or bottom of the reservoir 14, additional equipment such as a seal and/or pump may be necessary.

As is known in the art, adjustable base 84 may be a threaded adjustable base. Threads may be formed of any suitable size, shape and design and are designed to facilitate in the attachment of the tank interface assembly 16 to the top of the reservoir 14 by providing a means of attaching a bolt or ring securement device which may grip to the top of the tank by torsional and/or other frictional forces. In short, there are several ways known by those of skill in the art to associate the tank interface assembly 16 and the reservoir 14.

Adjustable base 84, while facilitating in the attachment of the tank interface assembly 16, also facilitates in providing a means of adjustment. The adjusting capabilities of the adjustable base 84 allow the tank interface assembly 16 to be attached facing a plurality of directions relative to the reservoir 14. Adjustable base 84 also allows adjustment of the tank interface assembly 16 which may be necessary for adjusting the sender 80 in accordance and/or alignment with the solenoid valve 86 and the reservoir 14.

In the arrangement shown, as one example, tank interface assembly 16 has a quick coupler 50. Quick couplers 50 may be formed of any suitable size, shape and design and are designed to facilitate attaching a conduit 11 to the tank interface assembly 16. Quick couplers 50 may be formed of any type of attachment which aids and/or allows fluid flow.

In the arrangement shown, as one example, quick coupler 50 is a male quick coupler which allows for female hose attachment. In the arrangement shown, as one example, the conduit 11 being attached is a pressurized hose. However, any other type of conduit 11 is hereby contemplated. Quick coupler 50 is designed to handle high pressure and or high temperature flows. Quick coupler 50 is designed to facilitate in quick and/or easy attachment requiring no tools and/or minimal tooling.

In the arrangement shown, as one example, quick coupler 50 is attached to the outside surface of the tank interface assembly 16. However, any other attachment means including attaching the quick coupler 50 to the interior side of the tank interface assembly 16 cover is hereby contemplated. In the arrangement shown, as one example, quick coupler 50 is connected directly to the solenoid valve 86.

In the arrangement shown, as one example, tank interface assembly 16 has the solenoid valve 86. Solenoid valve 86 may be formed of any suitable size, shape and design and is designed to facilitate the opening and closing of the fluid flow. The solenoid valve, as known in the art, is formed of a solenoid and a valve.

In the arrangement shown, as one example, solenoid valve 86 uses an electrical current to generate a magnetic field which regulates the opening of the valve to allow fluid flow between the valve 86, quick coupler 50 and tank 12. Solenoid valve 86 is designed to have a strong enough electrical current to generate a strong enough magnetic field for the opening and/or closing of the valve under high pressure fluid flow situations.

In the arrangement shown, as one example, a two port valve design is used to regulate a flow through the tank interface assembly 16. However, a multi-port valve assembly is also hereby contemplated for use. A multi-port solenoid valve assembly may be used to allow a single tank interface assembly 16 to interact with multiple reservoirs 14 or allow a plurality of supply tanks 12 the capability of interacting with a single reservoir 14 by producing a single fluid flow into a single reservoir 14. Additionally, multiple solenoid valves 86 may be placed together in the manifold 18.

In the arrangement shown, at least at FIG. 7, as one example, tank interface assembly 16 may also be formed of a manual switch 90, a cover 92, threads 85 of the adjustable base 84, the solenoid 86 (See FIGS. 8, 9, and 10), a fluid fill connection 96 (FIG. 7), a top 98 and a bottom 100.

In the arrangement shown, as one example, tank interface assembly 16 has a manual switch 90. Manual switch 90 may be formed of any suitable size, shape and design and is designed to facilitate the manual operation of the tank interface assembly 16. Manual operation of the tank interface assembly 16 may be necessary to manually activate or deactivate the solenoid valve 86 which would manually control the opening and closing of the valve.

The manual operation of the tank interface assembly 16 may be necessary in the event of sender 80 and/or float 82 failures, especially in the instance of float 82 failure. If the float 82 fails then the reservoir 14 may potentially overflow with fluid 20 or become empty without opening the valve 86. In this event, and/or a related event, it may become necessary for the tank to have manual operation. The manual switch 90 allows for the tank interface assembly 16 to be manually operated by a user.

In the arrangement shown, as one example, the manual switch 90 is affixed to the outer surface of the tank interface assembly 16, adjacent to the quick coupler 50. The manual switch 90 is available to facilitate the manual override of the solenoid valve 86 through an electrical connection. Additionally, the manual switch 90 facilitates as an emergency shutoff in the event of an emergency.

In the arrangement shown, as one example, tank interface assembly 16 has an electric cord opening 94. Electric cord opening 94 may be formed of any suitable size, shape and design and is designed to facilitate in incorporating and providing a power supply to the tank interface assembly 16. Solenoid valve 86 and/or other parts and components of the tank interface assembly 16 require power, via electrical current, for operation.

In the arrangement shown, as one example, electric cord opening 94 is an opening located in the tank interface assembly 16. The electric cord opening 94 is designed to facilitate and receive an electric cord. The electric cord, or other power supply device comes from power generated by the machine 22, in the example shown.

In the arrangement shown, as one example, tank interface assembly 16 has a fluid fill connection 96. Fluid fill connection 96 may be formed of any suitable size, shape and design and is designed to facilitate fluid 19 flow from the solenoid valve 86 into the reservoir 14. Fluid fill connection 96, in the arrangement shown as one example, is able to accommodate both high pressure and high temperature fluid 19 flow into the reservoir 14.

Reservoir:

In the arrangement shown, as one example, reservoir 14 is formed of any suitable size, shape, and design so as to facilitate the storage of a fluid, the filling and removing of a fluid. Reservoir 14 provides the fluid 19 and/or fuel 74 to keep the machine 22 in operation. Machine 22 may include any stationary motor, portable motor 87, and/or other machine which requires energy to operate and which is desired to be in operation. In the arrangement shown at FIG. 2, machine 22 is a stationary engine. Reservoir 14 has an opening or operable device which would allow reservoir 14 to be refilled by another source such as the supply tank 12, a fuel jug, a fuel truck, fuel tanker, or other source of fuel, including a pipeline.

Operation:

In the arrangement shown, as one example, the operation of remote filling system 10, employs supply tank 12, tank interface assembly 16, and reservoir 14. The supply tank 12 holds and/or stores a fluid 19. Supply tank 12 is fluidly connected to the tank interface assembly 16, typically by conduit 11. Tank interface assembly 16 is attached to or otherwise associated with the reservoir 14. Tank interface assembly 16 is fluidly connected to reservoir 14, such that tank interface assembly 16 can control and/or conduct a fluid flow from supply tank 12 all the way through to reservoir 14. Thus, in operation, tank interface assembly 16 can autonomously monitor and/or control the refill of reservoir 14 by moving fluid 19 from the supply tank 12 to the reservoir 14.

As previously described, a float 82 and sender 80 may be present in reservoir 14. As fluid 19 is added to reservoir 14 the float 82 rises because the float 82 is buoyant relative to the fluid 19 pushing the sender 80 upward. The upward force of the sender 80 may act as a switch which shuts-off and/or closes the solenoid valve 86. Thus, the fluid stops flowing when the fluid level in the reservoir 14 causes the sender to close the solenoid. This entire operation can take place without human interaction. Thus, a reservoir 14 in a remote location can be refilled with a fuel or other fluid 19 without a human and/or other component interacting with the Remote Multi-port Filling System. Power for these operations may be provided via battery or other power source; solar panels and/or wind generators mills may be co-located with the remote filling system 10 along with means to use the power directly or to charge batteries for supplemental use.

Additive Tank:

In this alternative embodiment of the remote, multi-port filling system, an additive tank 26 may be employed instead of the tank 12. This arrangement is, otherwise, highly similar to the refueling application previously described. However, many additives are temperature sensitive. This embodiment provides means to address temperature.

Figure 4:
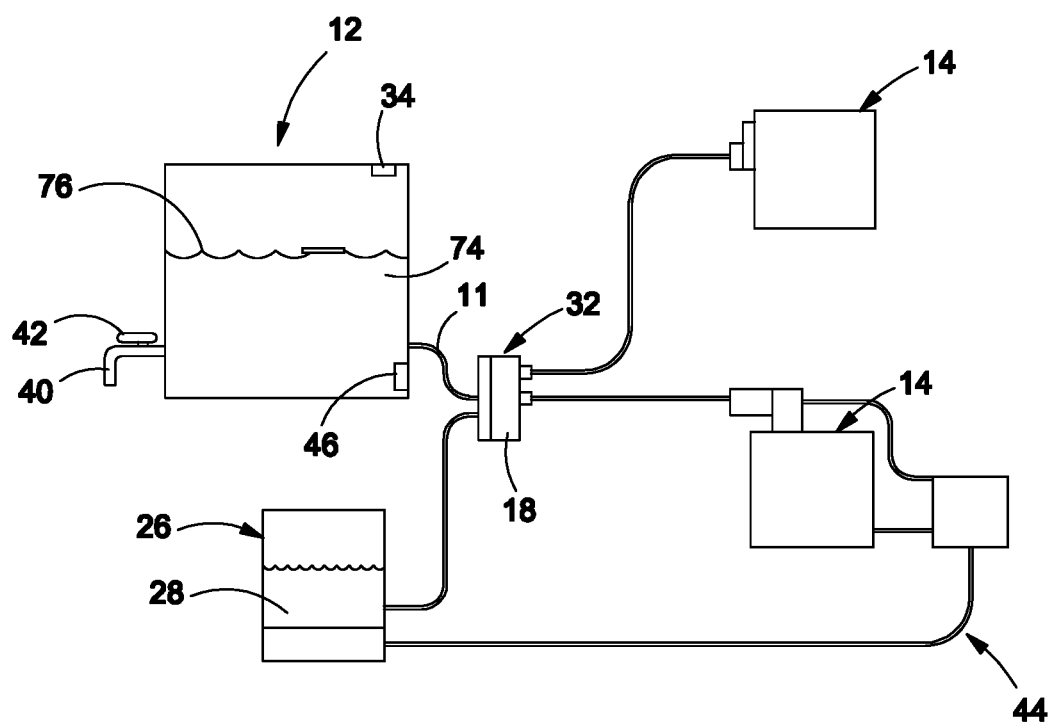
FIG. 4 shows a third embodiment of the remote filling system with means to convey heat.
Figure 9:
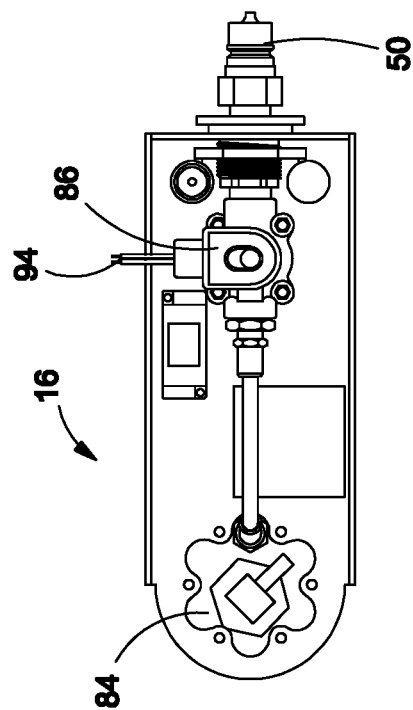
FIG. 9 shows a top view of the tank interface assembly with cover off.
Figure 8:
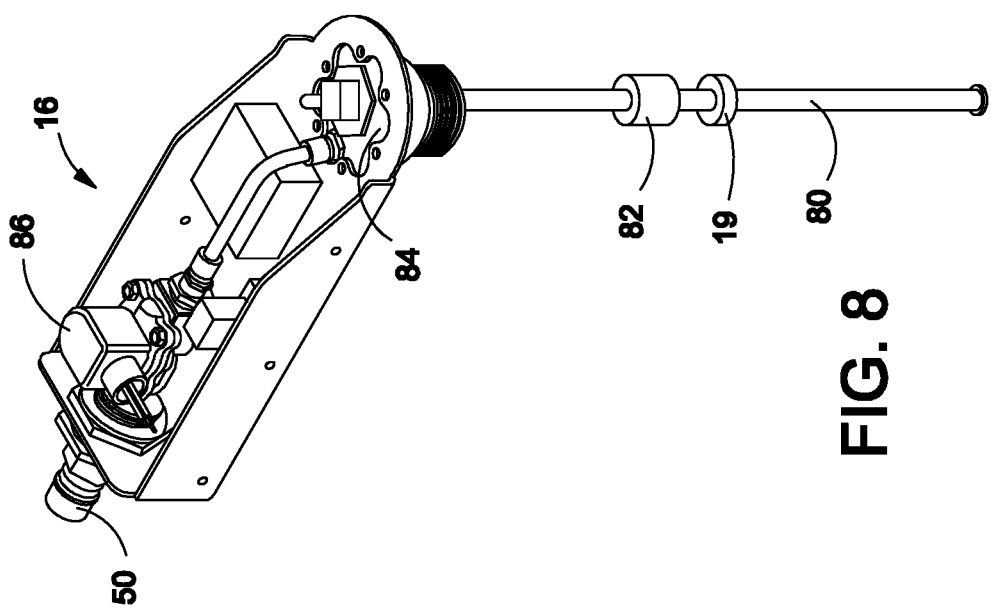
FIG. 8 shows a first perspective view of the tank interface assembly with cover off.
Figure 10:
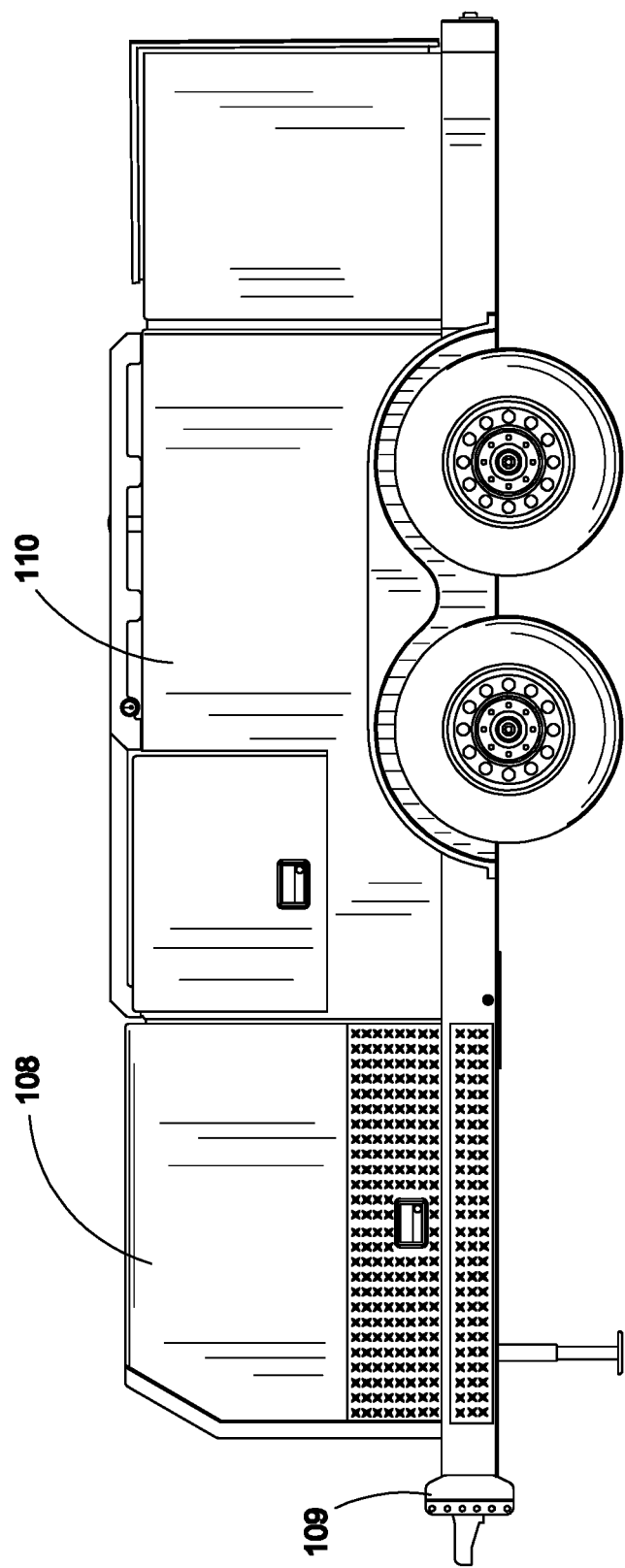
FIG. 10 shows a trailer 112 comprising the remote filling system.

Additive tank 26 is formed of any suitable size, shape and design and is configured to maintain the additive at conditions recommended for preservation and operative use and to house an additive 28 until needed. For these reasons, the remote filling system 10 of the present invention may be constructed to comprise means to convey heat. (See FIG. 4). This version of the system facilitates the use of passive heat. Both heat conductive materials and insulative materials may be employed for the purpose of transferring heat from, for example, pumping means 32 or a motor 87 associated with the remote filling system 10 or other heat-generating mechanics, to the additive tank 26 which may house DEF or another additive with temperature limits. Solar panels may be employed as heat supply.

Heat may be harvested in a manner common to the industry known as a heat sink, or collecting heat waste for use. In some embodiments, the elements of the remote filling system are arranged so as to form troughs, conduits, or other means to convey heat; in other embodiments, the remote filling system 10 comprises conduit members in the construction of the assembly as means to convey heat 44 past at least one of the supply tanks 12 in which fuel and/or additive is stored providing passive heat transfer.

Specifically, the remote filling system 10 comprising a reservoir 14 includes means to convey heat 44. (See FIG. 4) The heat conveyed may be generated as a byproduct of a pump motor 87 or may be produced by a heater or heating element. In any case, the means to convey heat 44 may comprise a conduit. (See FIG. 4). The conduit, as is known in the art, may be formed as part of the construction of the supply tank 12 or one or all the reservoirs 14, or may be in a heat transfer relationship with one or all of the supply tanks 12 via conduit 44 bringing heated air from the pump motor 87, heater, or heating element to at least the supply tank. In this manner, the additive or other temperature sensitive fluid can be maintained at the warmed temperature in the supply tank until the fluid is needed by one of the reservoirs at which time, the fluid can be supplied to the reservoir at the appropriate temperature and, in turn, to the engine in need of the additive.

Pump:

In an alternative embodiment, the pumping means 32 may be added or retro-fitted to the system 10. The supply tank 12 may be provided a pumping means 32 (see FIG. 4). In an alternative embodiment (not shown), each line feeding from the manifold 18 would have an individualized pumping means 32 for each of the tanks 14; the pumping means 32 for each tank 14 may be identical or may be sized according to the expected ratio of use of the fluid stored in each tank 14, or according to the relative volumes of the respective fluid 19 flows and/or the relative speed of fluid 19 flow.

Direct Connection:

In an alternative embodiment, system 10 comprises a direct connection. In this arrangement (not shown), supply tank 12 has a plurality of openings to feed a plurality of conduits 11. Each conduit 11 fluidly and/or directly connects a reservoir 14 to the supply tank 12. Each said opening of the supply tank 12 having a valve fluidly connected to a conduit 11 which is fluidly associated with a reservoir 14.

Additionally, a method of remote refilling of machines and/or tanks is hereby contemplated.

Electronic Communication and Operation:

An alternative embodiment may comprise generating an adaptive routine for tracking historical data regarding energy consumption. An example of an adaptive routine, may be for monitoring and/or tracking an hour-by-hour fuel consumption or a day-by-day energy consumption of a fuel 20 and/or an additive 28 and/or a mixture.

Another embodiment may include predicting a time for delivering fuel and/or forecasting a frequency of fuel delivery to a site based on an average fuel consumption at a site.

Additionally, the present disclosure could be employed as a means to remotely decrease energy consumption by a machine or as means of triggering on/off for a machine 22 based on monitored fuel consumption determinations and/or historical data.

Trailer mounted integration may be accomplished in any of several ways. One such arrangement is shown at FIGS. 11-19. System 10 may be integrated with the trailer 110 as is known in the art. Trailer 110 may be comprised of any suitable size, shape and design and is configured to facilitate ease of operation of the system.

In this embodiment, trailer 110 may be constructed to comprise at least two compartments; the first one to act as the tank 12 to contain fuel 20 (fluid 19) and the second 119 to house the multi-port remote refueling system 10 mechanics and controls. Specifically, in an embodiment, the second compartment, 119, at least substantially encloses one or more of the conduit reel 114, power cord 116, power cord reel 118, pumping control system 120, bulk loading system 124, the manifold, control panel 66, and a safety fault system 122. In one embodiment, processor 52 and memory 62 may record and process a plurality of signals 58 related to the operation of the remote filling system and transmit information relating to status and faults in the multi-port remote filling system.

It will be appreciated by those skilled in the art that other various modifications could be made to the device without parting from the spirit and scope of this disclosure. All such modifications and changes fall within the scope of the claims and are intended to be covered thereby.

SELECTED REFERENCE NUMERALS AS CLAIMED

10—Multi-port remote Filling system
11—Conduit
12—Supply Tank
13—Opening (of Supply Tank 12) (to transfer fuel out of tank 12)
14—Reservoir (reservoir associated with engine)
16—Tank Interface Assembly
18—Manifold
19—Fluid
20—Fuel
21—Sensing means (float)
22—Machines
23—Engine
24—Sensor (electronic or other)
25—Means to Communicate (of System 10)
26—Additive Tank (FIG. 4)
27—Signals
28—Additive
29—Wireless Network
30—Diesel Exhaust Fuel (DEF)
31—Means to initiate
32—Pumping means
34—Tank Fill (of supply tank)
36—tag
38—Switch
40—Nozzle Access
42—Nozzle
44—Means to convey Heat
46—Tank Empty
50—Quick couplers
52—Processor
54—Valve
58—Signal
60—Computing Device
62—Memory
64—Software
66—User Interface a.k.a control panel
67—Remote Display
72—Remote operator
76—Fluid Level
80—Sender
82—Float
84—Adjustable Base
85—Threads (of Adjustable Base 84)
86—Solenoid Valve
87—Pump motor
90—Manual Switch (of Tank Interface Assembly 16)
92—Cover (of TIA 16)
94—Electric Cord Opening
96—Fluid Fill Connection (of TIA 16)
98—Top (of TIA 16)
100—Bottom (of TIA 16)
108—Utility Box
110—Trailer
112—Control Box
114—Conduit Reel
116—Power Cord
118—Power Cord Reel
120—Pumping Control System
122—Safety Fault System
124—Bulk Loading System
126—hitching means
130—second manifold (4 port)
132—ports on manifold
134—4-way valve (2) on 4-port manifold
136—check valve
138—pressure switch
140—elbows

What is claimed:

1. A multi-port remote filling system, the system comprising:
    a supply tank mounted on a trailer;
    at least one reservoir, each said reservoir fluidly associated with a stationary engine;
    each said reservoir comprising a tank interface assembly each said assembly fluidly associated with the supply tank;
    each said at least one tank interface assembly associated with a fluid level sensor configured to detect a level of fluid in the reservoir, the fluid level sensor comprising a float and a sender, wherein the sender is operatively connected to the float, and said sender comprises a relative vertical position, said position changing with the depth of the fluid in the reservoir, wherein when the float lowers the sender to the bottom of the reservoir, the sender opens a solenoid valve in the tank interface assembly controlling the flow of the fluid from the supply tank thereby refilling the reservoir, and when the float is adequately buoyed by the fluid in the reservoir, the sender closes the solenoid valve.

2. The system of claim 1, wherein at least one of the tank interface assemblies further comprises a manual switch, at least one quick coupler, and a fluid fill connection.

3. The system of claim 2, wherein the supply tank provides any one of diesel exhaust fluid, gas, natural gas, propane, hydrogen, or bio-fuel.

4. The system of claim 2, further comprising:
an auxiliary heater to supply heat to fluid in the supply tank to maintain operable temperature of the fluid in the supply tank without means to supply heat to said more than one reservoirs.

5. The system of claim 2, further comprising:
a manifold, said manifold fluidly associated with the supply tank for the purpose of fluid distribution to each of said more than one reservoir.

6. The system of claim 5, wherein at least the supply tank and the manifold are mounted on a wheeled trailer.

7. The system of claim 6, further comprising:
a utility box, wherein the utility box comprises said manifold, a power supply cord, a power supply cord reel, a conduit, a conduit reel, and a fluid pump.

8. The system of claim 7, wherein the supply tank provides one of diesel exhaust fluid, gas, natural gas, propane, hydrogen, or bio-fuel.

9. The system of claim 1, further comprising:
a computing device, wherein the fluid level sensor is associated with said computing device.

10. The system of claim 9, wherein said computing device comprises a processor and memory.

11. The system of claim 1, further comprising:
a utility box, wherein the utility box comprises a first multi-port manifold and a second four-port manifold in series with the first multi-port manifold, a power supply cord, a power supply cord reel, a conduit, a conduit reel, a plurality of quick couplers for transfer of fluid from the supply tank to any one or more reservoir, and a pump, wherein at least the utility box is mounted on a wheeled trailer.

12. The system of claim 1, wherein a conduit fluidly connects the supply tank to a quick coupler associated with the tank interface assembly.

13. The system of claim 1, wherein the supply tank provides one of diesel exhaust fluid, gas, natural gas, propane, hydrogen, or bio-fuel.

14. The system of claim 1, wherein the system further comprises:
an adaptive routine for tracking historical data regarding fluid flow, wherein the system further comprises a processor, a computing device, software, and a user interface for automating the adaptive routine.

15. The system of claim 1, further comprising:
a manifold, wherein each of said tank interface assemblies is associated with the supply tank by said manifold.

16. The system of claim 1, wherein a first conduit fluidly connects the supply tank to a quick coupler of the tank interface assembly; wherein a second conduit fluidly connects the tank interface assembly to the tank.

* * * * *